United States Patent
Wang et al.

(10) Patent No.: US 12,483,979 B2
(45) Date of Patent: Nov. 25, 2025

(54) TECHNIQUES FOR BIASING CELL CAMPING IN HIGH-SPEED USER EQUIPMENT DEPLOYMENT

(71) Applicant: QUALCOMM Incorporated, San Diego, CA (US)

(72) Inventors: Shanshan Wang, San Diego, CA (US); Arvind Vardarajan Santhanam, San Diego, CA (US); Reza Shahidi, La Jolla, CA (US); Peng Hu, Beijing (CN); Daniel Amerga, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 308 days.

(21) Appl. No.: 18/260,312

(22) PCT Filed: Jan. 15, 2021

(86) PCT No.: PCT/CN2021/072082
§ 371 (c)(1),
(2) Date: Jul. 3, 2023

(87) PCT Pub. No.: WO2022/151332
PCT Pub. Date: Jul. 21, 2022

(65) Prior Publication Data
US 2024/0073807 A1    Feb. 29, 2024

(51) Int. Cl.
*H04W 48/20* (2009.01)
*H04W 36/00* (2009.01)
(Continued)

(52) U.S. Cl.
CPC ....... *H04W 48/20* (2013.01); *H04W 36/0058* (2018.08); *H04W 76/20* (2018.02); *H04W 76/27* (2018.02)

(58) Field of Classification Search
CPC . H04W 36/0058; H04W 36/32; H04W 48/20; H04W 76/20; H04W 76/27
See application file for complete search history.

(56) References Cited

U.S. PATENT DOCUMENTS 11,917,606 B2 *   2/2024   Bai ................ H04W 56/0045
2011/0263262 A1 * 10/2011  Min ............... H04W 36/324
                                                455/438
(Continued)

FOREIGN PATENT DOCUMENTS

WO   WO-2015083015 A1   6/2015
WO   WO-2016122377 A1   8/2016
(Continued)

OTHER PUBLICATIONS

Supplementary European Search Report—EP21918539—Search Authority—Munich—Sep. 23, 2024.
(Continued)

*Primary Examiner* — Kashif Siddiqui
(74) *Attorney, Agent, or Firm* — QUALCOMM Incorporated

(57) ABSTRACT

Methods, systems, and devices for wireless communications are described. A user equipment (UE) may determine that a cell is associated with a deployment mode based on a condition being satisfied, where the deployment mode may be associated with serving one or more UEs travelling at high speeds. The UE may select from one of a frequency-based initial cell selection or a cell-based initial cell selection and may measure one or more frequencies of one or more cells including the cell to obtain a set of measured parameters, each cell corresponding to a respective deployment mode and a respective measured parameter. The UE may select a candidate cell from the one or more cells based on the respective measured parameters of each cell and the
(Continued)

respective deployment modes of each cell and may establish a connection with the candidate cell based on the selecting.

30 Claims, 15 Drawing Sheets

(51) Int. Cl.
*H04W 76/20* (2018.01)
*H04W 76/27* (2018.01)

(56) References Cited

U.S. PATENT DOCUMENTS

| | | | | |
|---|---|---|---|---|
| 2014/0064247 A1* | 3/2014 | Teyeb | ........... | H04W 36/008375 370/331 |
| 2015/0312826 A1* | 10/2015 | Yiu | ....................... | H04W 48/16 455/437 |
| 2016/0073307 A9 | 3/2016 | Jang | | |
| 2019/0222367 A1* | 7/2019 | Tseng | ................ | H04W 36/0069 |
| 2020/0128467 A1* | 4/2020 | Gao | .................. | H04W 36/0088 |
| 2020/0374079 A1* | 11/2020 | Chervyakov | ....... | H04L 27/2657 |
| 2020/0413317 A1* | 12/2020 | Gao | ...................... | H04W 24/08 |

FOREIGN PATENT DOCUMENTS

| | | |
|---|---|---|
| WO | WO-2018201399 A1 | 11/2018 |
| WO | WO-2018210237 A1 | 11/2018 |
| WO | WO-2019000390 A1 | 1/2019 |

OTHER PUBLICATIONS

International Search Report and Written Opinion—PCT/CN2021/072082—ISA/EPO—Oct. 12, 2021.

* cited by examiner

TECHNIQUES FOR BIASING CELL CAMPING IN HIGH-SPEED USER EQUIPMENT DEPLOYMENT

CROSS REFERENCE

The present Application is a 371 national stage filing of International PCT Application No. PCT/CN2021/072082 by Wang et al. entitled "TECHNIQUES FOR BIASING CELL CAMPING IN HIGH-SPEED USER EQUIPMENT DEPLOYMENT," filed Jan. 15, 2021, which is assigned to the assignee hereof, and which is expressly incorporated by reference in its entirety herein.

FIELD OF TECHNOLOGY

The following relates to wireless communications, including techniques for biasing cell camping in high-speed user equipment deployment.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

UEs may operate in high speed environments, such as in trains, vehicles, etc. High-speed train (HST) cells may be distributed along HST routes to support enhanced wireless communication capabilities. For example, HSTs can travel at velocities sometimes up to 500 kilometers per hour (kph) or even greater. Such environments may be served by HST cells that include transmission/reception points (TRPs) to assist a UE in maintaining coverage when traveling and being served by the HST cell. During cell selection at a UE, the UE measures signals from available cells and selects a cell for connection based on the measurements. The UE makes such measurements and performs cell selection, and then transmits a connection establishment request to the selected cell. For example, a UE operating in a high speed environment, e.g., on an HST, may measure signals from HST cells and non-HST cells and may select a non-HST cell with a largest signal power based on the signal measurements. Such selection techniques may lead to a UE establishing a connection with a less-reliable cell (e.g., a non-HST cell) due to the high mobility of the UE, which may then be followed by a handover or multiple handover procedures to a more suitable cell, which may consume power and network resources, and increases latency.

SUMMARY

The described techniques relate to improved methods, systems, devices, and apparatuses that support techniques for biasing cell camping in high-speed UE deployment. Generally, the described techniques provide for applying biases to some types of cells so that such cells may be selected over other types of cells. For example, a user equipment (UE) may be biased toward selecting a high-speed train (HST) cell when in a high-speed deployment. For example, a UE may determine a neighboring cell is an HST cell and apply a bias such that the HST cell may be selected over a non-HST cell even if a measured signal power of the HST cell is lower than the measured signal power of the non-HST cell. In order to select an HST cell, the UE may measure frequencies associated with a set of neighboring cells and determine that at least one of the neighboring cells satisfies a power threshold. The UE may identify a subset of the neighboring cells having a signal strength that satisfies a signal strength threshold. The UE may select a suitable HST cell from the subset of neighboring cells regardless of the presence of a stronger non-HST in the set of neighboring cells.

The UE may evaluate whether to perform a cell reselection procedure and may apply a power offset to the power measurement of one or more neighboring HST cells, or the previously selected HST cell, or both. Thus, the UE may determine to camp on the selected HST cell or select a different HST cell regardless of the presence of a non-HST cell having a power within the offset. In some examples, the UE may transmit the offset power measurement to a base station as part of a handover procedure and thus may receive signaling from the base station that indicates an HST cell for communications even if a stronger non-HST cell is available. As such, a UE in a high-speed deployment may be appropriately matched with an HST cell for efficient cell selection, reselection, or handover.

A method for wireless communication at a user equipment (UE) is described. The method may include determining that a first cell is associated with a first deployment mode of a set of multiple deployment modes based on at least one of a set of multiple conditions of the first cell being satisfied, the first deployment mode associated with serving one or more UEs travelling at a speed above a speed threshold, selecting, based on the determination, at least one of a frequency-based initial cell selection or a cell-based initial cell selection for the UE, where the selection is based on a frequency database or a cell database, or both, measuring one or more frequencies of one or more cells including the first cell to obtain a set of measured parameters, each cell of the one or more cells corresponding to a respective deployment mode of the set of multiple deployment modes and a respective measured parameter of the set of measured parameters, selecting a candidate cell from the one or more cells based on the respective measured parameters of each cell and the respective deployment modes of each cell, and establishing, as part of the initial cell selection, a connection with the candidate cell based on selecting the candidate cell.

An apparatus for wireless communication at a UE is described. The apparatus may include a processor, memory in electronic communication with the processor, and instructions stored in the memory. The instructions may be executable by the processor to cause the apparatus to determine that a first cell is associated with a first deployment mode of a set of multiple deployment modes based on at least one of a set of multiple conditions of the first cell being satisfied, the first deployment mode associated with serving one or more UEs travelling at a speed above a speed threshold, select, based on the determination, at least one of a frequency-based initial cell selection or a cell-based initial cell selection for the UE, where the selection is based on a frequency database or a cell database, or both, measure one or more frequencies of one or more cells including the first cell to obtain a set of measured parameters, each cell of the one or more cells corresponding to a respective deployment mode of the set of multiple deployment modes and a respective measured parameter of the set of measured parameters, select a candidate cell from the one or more cells based on the respective measured parameters of each cell and the respective deployment modes of each cell, and establish, as part of the initial cell selection, a connection with the candidate cell based on selecting the candidate cell.

Another apparatus for wireless communication at a UE is described. The apparatus may include means for determining that a first cell is associated with a first deployment mode of a set of multiple deployment modes based on at least one of a set of multiple conditions of the first cell being satisfied, the first deployment mode associated with serving one or more UEs travelling at a speed above a speed threshold, means for selecting, based on the determination, at least one of a frequency-based initial cell selection or a cell-based initial cell selection for the UE, where the selection is based on a frequency database or a cell database, or both, means for measuring one or more frequencies of one or more cells including the first cell to obtain a set of measured parameters, each cell of the one or more cells corresponding to a respective deployment mode of the set of multiple deployment modes and a respective measured parameter of the set of measured parameters, means for selecting a candidate cell from the one or more cells based on the respective measured parameters of each cell and the respective deployment modes of each cell, and means for establishing, as part of the initial cell selection, a connection with the candidate cell based on selecting the candidate cell.

A non-transitory computer-readable medium storing code for wireless communication at a UE is described. The code may include instructions executable by a processor to determine that a first cell is associated with a first deployment mode of a set of multiple deployment modes based on at least one of a set of multiple conditions of the first cell being satisfied, the first deployment mode associated with serving one or more UEs travelling at a speed above a speed threshold, select, based on the determination, at least one of a frequency-based initial cell selection or a cell-based initial cell selection for the UE, where the selection is based on a frequency database or a cell database, or both, measure one or more frequencies of one or more cells including the first cell to obtain a set of measured parameters, each cell of the one or more cells corresponding to a respective deployment mode of the set of multiple deployment modes and a respective measured parameter of the set of measured parameters, select a candidate cell from the one or more cells based on the respective measured parameters of each cell and the respective deployment modes of each cell, and establish, as part of the initial cell selection, a connection with the candidate cell based on selecting the candidate cell.

Some examples of the method, apparatuses, and non-transitory computer-readable medium described herein may further include operations, features, means, or instructions for receiving, from the first cell, an indication of the first deployment mode, determining that the at least one condition may be satisfied based on receiving the indication of the first deployment mode, selecting the cell-based initial cell selection based on the at least one condition being associated with the frequency database and the cell database, and determining a set of power levels associated with the one or more cells based on the cell-based initial cell selection, the set of measured parameters including the set of power levels, where the candidate cell may be selected based on the set of power levels.

In some examples of the method, apparatuses, and non-transitory computer-readable medium described herein, selecting the candidate cell may include operations, features, means, or instructions for selecting the candidate cell associated with a highest power level of the set of power levels and associated with the first deployment mode.

Some examples of the method, apparatuses, and non-transitory computer-readable medium described herein may further include operations, features, means, or instructions for determining that at least one power level of the set of power levels satisfies a first threshold, determining a subset of the one or more cells based on the at least one power level of the set of power levels satisfying the first threshold, where a respective power level associated with each of the subset of the one or more cells satisfies a second threshold, and selecting the candidate cell from the subset, where the candidate cell may be associated with the first deployment mode.

Some examples of the method, apparatuses, and non-transitory computer-readable medium described herein may further include operations, features, means, or instructions for determining that at least one power level of the set of power levels satisfies a first threshold, determining a first subset of the one or more cells based on the at least one power level of the set of power levels satisfying the first threshold, where a respective power level associated with each of the first subset of the one or more cells satisfies a second threshold, determining that each cell of the first subset may be absent from the cell database, and selecting the candidate cell from a second subset of the one or more cells, the second subset different from the first subset.

Some examples of the method, apparatuses, and non-transitory computer-readable medium described herein may further include operations, features, means, or instructions for determining that each power level of the set of power levels may be below a first threshold, where the candidate cell may be selected based on determining that each power level of the set of power levels may be below the first threshold, the candidate cell associated with a highest power level of the set of power levels.

Some examples of the method, apparatuses, and non-transitory computer-readable medium described herein may further include operations, features, means, or instructions for searching a database of cell frequencies corresponding to the first deployment mode before searching other cell frequencies, where searching the database of cell frequencies includes temporally prioritizing entries of the database of cell frequencies.

Some examples of the method, apparatuses, and non-transitory computer-readable medium described herein may further include operations, features, means, or instructions for selecting the frequency-based initial cell selection based on the at least one condition being associated with the frequency database, determining a set of power levels associated with a subset of the one or more cells based on the frequency-based initial cell selection, the set of measured parameters including the set of power levels, where each cell of the subset corresponds to the first deployment mode, and selecting the candidate cell from the subset based on the set of power levels.

Some examples of the method, apparatuses, and non-transitory computer-readable medium described herein may further include operations, features, means, or instructions for selecting the frequency-based initial cell selection based on the at least one condition being associated with the frequency database, determining a set of power levels associated with a first subset of the one or more cells based on the frequency-based initial cell selection, the set of measured parameters including the set of power levels, where each cell of the first subset corresponds to the first deployment mode, and selecting the candidate cell from a second subset of the one or more cells based on the set of power levels, the second subset exclusive of the first subset.

Some examples of the method, apparatuses, and non-transitory computer-readable medium described herein may further include operations, features, means, or instructions for determining the UE may be associated with a first radio access technology and scanning frequencies associated with the first radio access technology, where measuring the one or more frequencies associated with the one or more cells may be based on scanning the frequencies associated with the first radio access technology.

Some examples of the method, apparatuses, and non-transitory computer-readable medium described herein may further include operations, features, means, or instructions for determining whether an indication associated with the one or more cells may be set to true and adding the measured one or more frequencies to a database based on the associated indication being set to true.

In some examples of the method, apparatuses, and non-transitory computer-readable medium described herein, the at least one condition may include operations, features, means, or instructions for receiving system information that indicates the first deployment mode from the first cell, where the first cell may be associated with a second radio access technology.

In some examples of the method, apparatuses, and non-transitory computer-readable medium described herein, the system information includes a random access channel preamble configuration indicative of the first deployment mode.

In some examples of the method, apparatuses, and non-transitory computer-readable medium described herein, the system information includes a system information block that includes a deployment mode flag indicative of the first deployment mode.

In some examples of the method, apparatuses, and non-transitory computer-readable medium described herein, the at least one condition may include operations, features, means, or instructions for receiving system information that indicates the first deployment mode from the first cell.

Some examples of the method, apparatuses, and non-transitory computer-readable medium described herein may further include operations, features, means, or instructions for adding a measured frequency corresponding to the first cell to a database, where the database may be valid for a period of time, determining that at least one cell of the one or more cells may be a potential candidate cell based on the measured frequency being present in the database, and adding an identifier of the potential candidate cell to a second database.

In some examples of the method, apparatuses, and non-transitory computer-readable medium described herein, the at least one condition may include operations, features, means, or instructions for detecting, by at least one subscriber identity module card of the UE, that the at least one condition may be satisfied, where the set of multiple conditions includes a random access channel preamble configuration associated with the first deployment mode, a system information block 1 (SIB-1) including a first deployment mode flag, a system information block 2 (SIB-2) including the first deployment mode flag, or a frequency tracking loop (FTL) jump at the UE, or any combination thereof.

In some examples of the method, apparatuses, and non-transitory computer-readable medium described herein, determining that the first cell may be associated with the first deployment mode may include operations, features, means, or instructions for determining a country code associated with the first cell, a public land mobile network associated with the cell, or both.

In some examples of the method, apparatuses, and non-transitory computer-readable medium described herein, determining that the first cell may be associated with the first deployment mode may include operations, features, means, or instructions for determining that a velocity associated with the UE exceeds a threshold based on one or more sensors of the UE.

In some examples of the method, apparatuses, and non-transitory computer-readable medium described herein, determining that the first cell may be associated with the first deployment mode may include operations, features, means, or instructions for obtaining information from one or more other UEs indicating that the first cell may be associated with the first deployment mode based on a cell global identifier of the first cell.

In some examples of the method, apparatuses, and non-transitory computer-readable medium described herein, the UE selects from one of the frequency-based initial cell selection or the cell-based initial cell selection based on connecting to a network based on the UE powering up, connecting to a network based on the UE being in a reduced capability mode, connecting to a network based on the UE being out of service, connecting to a network based on the UE experiencing a radio link failure, or connecting to a network based on the UE performing a fast return procedure.

A method for wireless communication at a UE is described. The method may include determining that a first cell is associated with a first deployment mode of a set of multiple deployment modes based on one or more conditions being satisfied, the first deployment mode associated with a speed above a speed threshold, establishing a connection with the first cell based on determining that the first cell is associated with the first deployment mode, performing a set of measurements for one or more neighboring cells and the first cell to obtain a set of measured values, each of the one or more neighboring cells and the first cell corresponding to a respective measured value of the set of measured values, applying an offset to the respective measured value associated with the first cell based on the first cell being associated with the first deployment mode, and determining whether to connect to one of the one or more neighboring cells based on the applied offset to the respective measured value associated with the first cell and respective measured values associated with the one or more neighboring cells.

An apparatus for wireless communication at a UE is described. The apparatus may include a processor, memory in electronic communication with the processor, and instructions stored in the memory. The instructions may be executable by the processor to cause the apparatus to determine that a first cell is associated with a first deployment mode of a set of multiple deployment modes based on one or more conditions being satisfied, the first deployment mode associated with a speed above a speed threshold, establish a connection with the first cell based on determining that the first cell is associated with the first deployment mode, perform a set of measurements for one or more neighboring cells and the first cell to obtain a set of measured values, each of the one or more neighboring cells and the first cell corresponding to a respective measured value of the set of measured values, apply an offset to the respective measured value associated with the first cell based on the first cell being associated with the first deployment mode, and determine whether to connect to one of the one or more neighboring cells based on the applied offset to the respective measured value associated with the first cell and respective measured values associated with the one or more neighboring cells.

Another apparatus for wireless communication at a UE is described. The apparatus may include means for determining that a first cell is associated with a first deployment mode of a set of multiple deployment modes based on one or more conditions being satisfied, the first deployment mode associated with a speed above a speed threshold, means for establishing a connection with the first cell based on determining that the first cell is associated with the first deployment mode, means for performing a set of measurements for one or more neighboring cells and the first cell to obtain a set of measured values, each of the one or more neighboring cells and the first cell corresponding to a respective measured value of the set of measured values, means for applying an offset to the respective measured value associated with the first cell based on the first cell being associated with the first deployment mode, and means for determining whether to connect to one of the one or more neighboring cells based on the applied offset to the respective measured value associated with the first cell and respective measured values associated with the one or more neighboring cells.

A non-transitory computer-readable medium storing code for wireless communication at a UE is described. The code may include instructions executable by a processor to determine that a first cell is associated with a first deployment mode of a set of multiple deployment modes based on one or more conditions being satisfied, the first deployment mode associated with a speed above a speed threshold, establish a connection with the first cell based on determining that the first cell is associated with the first deployment mode, perform a set of measurements for one or more neighboring cells and the first cell to obtain a set of measured values, each of the one or more neighboring cells and the first cell corresponding to a respective measured value of the set of measured values, apply an offset to the respective measured value associated with the first cell based on the first cell being associated with the first deployment mode, and determine whether to connect to one of the one or more neighboring cells based on the applied offset to the respective measured value associated with the first cell and respective measured values associated with the one or more neighboring cells.

Some examples of the method, apparatuses, and non-transitory computer-readable medium described herein may further include operations, features, means, or instructions for applying the offset to one or more other cells, where each of the one or more other cells may be associated with the first deployment mode.

In some examples of the method, apparatuses, and non-transitory computer-readable medium described herein, the first cell may be associated with a first radio access technology and the one or more neighboring cells may be associated with the first radio access technology or a second radio access technology and the method, apparatuses, and non-transitory computer-readable medium may include further operations, features, means, or instructions for applying the offset to a subset of the one or more neighboring cells associated with the first deployment mode and transmitting, to a base station, a measurement report including the set of measured values including an offset value corresponding to the offset applied to the respective measured value associated with the first cell and offset values corresponding to the offset applied to the one or more neighboring cells associated with the first deployment mode.

Some examples of the method, apparatuses, and non-transitory computer-readable medium described herein may further include operations, features, means, or instructions for transmitting, to a base station, a measurement report including the set of measured values including an offset value corresponding to the offset applied to the respective measured value associated with the first cell.

Some examples of the method, apparatuses, and non-transitory computer-readable medium described herein may further include operations, features, means, or instructions for receiving, from the base station, a handover command indicating that the UE may be to handover to one of the one or more neighboring cells based on the measurement report and performing cell handover based on receiving the handover command.

In some examples of the method, apparatuses, and non-transitory computer-readable medium described herein, the UE may be in a radio resource control (RRC) connected mode.

In some examples of the method, apparatuses, and non-transitory computer-readable medium described herein, the UE may be in an RRC idle mode or an RRC inactive mode.

In some examples of the method, apparatuses, and non-transitory computer-readable medium described herein, the one or more conditions may include operations, features, means, or instructions for receiving system information that indicates the first deployment mode from the first cell, where the first cell may be associated with a second radio access technology.

DETAILED DESCRIPTION

Figure 1:
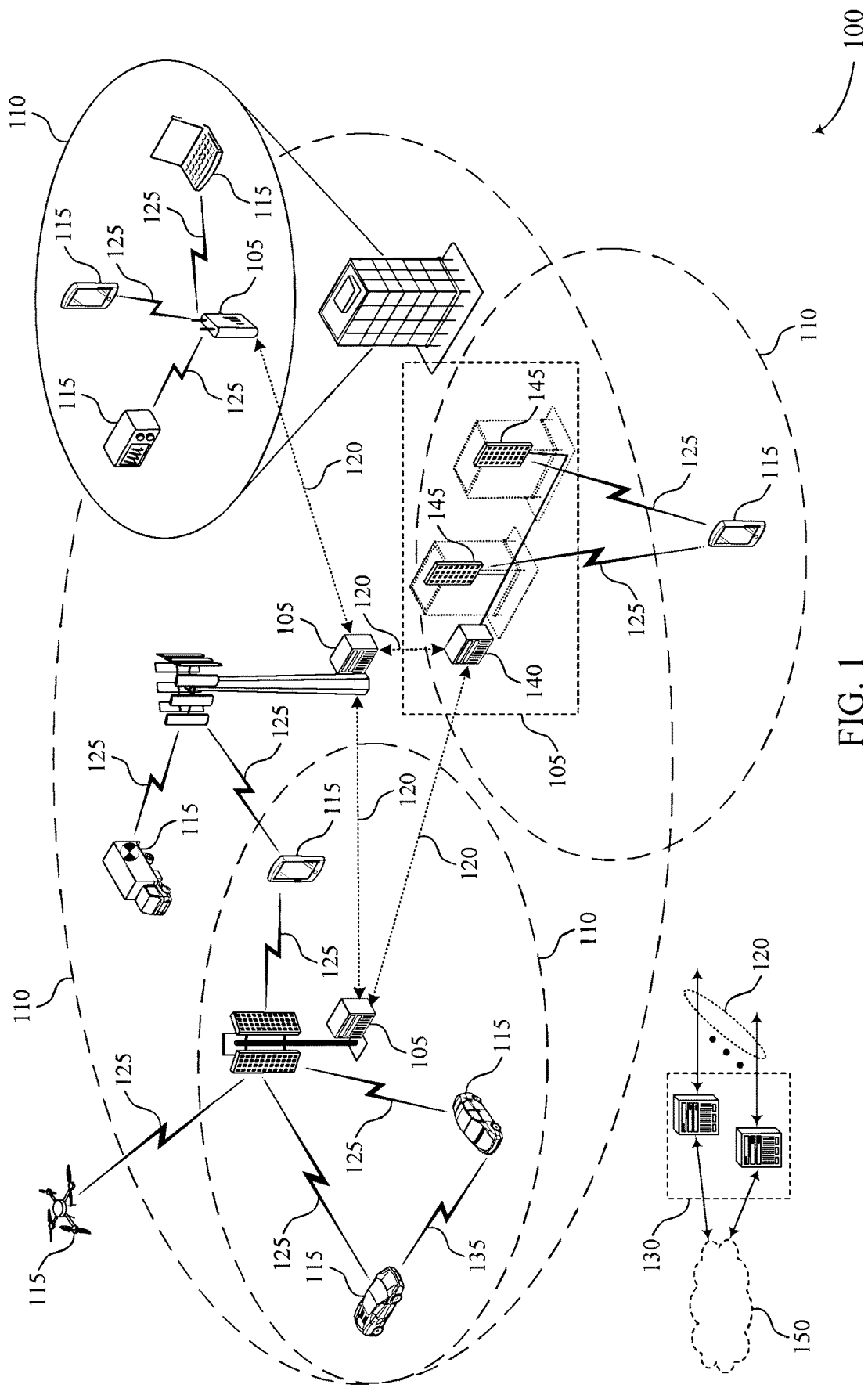
FIG. 1 illustrates an example of a wireless communications system that supports techniques for biasing cell camping in high-speed UE deployment in accordance with various aspects of the present disclosure.

High-speed trains (HSTs) can travel at velocities sometimes up to 500 kilometers per hour (kph) or even greater. Such environment may be served by HST cells that include transmission/reception points (e.g., repeaters) to assist a user equipment (UE) in maintaining steady coverage as it is traveling and being served by the HST cell. A UE may determine that it is operating in a high-speed environment based on a number of triggers or indications and may opt to select an HST cell which may have better signal quality during high mobility instances than a non-HST cell. For example, a UE may receive system information from a base station that includes network configurations or flags that indicate the associated cell is an HST cell and the UE may determine it is in an HST mode based on receiving this information. In some examples, a UE may support other methods of detection (e.g., proprietary) based on sensor information, Doppler measurements, frequency measurements, or the like.

There may be a number of conditions (e.g., triggers, indications, sensor data, or the like) associated with HST cells that a UE may detect and based on these conditions may determine that it is in the HST mode. In one example, a UE may detect a frequency jump associated with a UE and may transmit an indication to the base station. The indication may be set to TRUE when the frequency jump satisfies a threshold and may be set to FALSE when the frequency jump does not satisfy the threshold or if the UE does not detect a frequency jump. The UE may determine that it is in the HST mode when the indication is set to TRUE. The UE may detect a number of cell frequencies and may add each frequency to a database of NR HST frequencies while the UE is in the HST mode (e.g., while the indication is set to TRUE). In some cases, the NR HST frequency database may be valid for cell selection for a time (e.g., 5 minutes) during which the UE may consider the frequencies to be HST cell frequencies. In such cases, a UE may determine that a frequency of the NR HST frequency database is associated with an HST cell but may be unable to identify if specific cells on the frequency are HST cells. In other words, a UE may add the frequency of an HST cell to the NR HST frequency database and may detect a second cell on the same frequency. The second cell may be an HST cell or may be a non-HST cell.

In some other examples, the UE may receive system information (e.g., system information block 1 (SIB1)) that includes an HST-specific configuration or HST flag. For example, the SIB1 may include a physical random access channel (PRACH) configuration for HST or may include an SIB1 HST flag. Based on receiving the system information (e.g., SIB1) indicating the cell is an HST cell, the UE may add the frequency of the cell to the NR HST frequency database described herein, which may be valid for a period of time. The UE may also add information associated with the cell to an NR HST cell database based on receiving the system information (e.g., including information identifying the specific cell rather than just an associated frequency). In other words, a UE may add the frequency of an HST cell to the NR HST frequency database and may add the cell-specific information of the HST cell to the NR HST cell database. The UE may be able to determine whether the second cell is an HST cell by searching for the frequency associated with the second cell in the NR HST frequency database and searching for cell-specific information associated with the second cell in the NR HST cell database. The UE may determine the second cell is an HST cell based on the second cell being present in both databases.

In some other examples, the UE may be served by an LTE cell and may receive system information (e.g., system information block 2 (SIB2)) that includes an HST flag. The UE may perform handover or reselection to an NR cell while camped on the HST LTE serving cell and may add a target cell's detected NR cell frequencies to the NR HST frequency database based on the HST status of the LTE cell. In some cases, the UE may perform handover or reselection to an LTE cell while camped on the HST NR serving cell and may add a target cell's detected LTE cell frequencies to the LTE HST frequency database based on the HST status of the NR cell. In this way, a UE may carry over or remain in the HST mode during inter-RAT transitions In yet other examples, a UE may include a plurality of subscriber identity module (SIM) cards, any one of which may detect one of the HST mode conditions described herein. The UE may determine it is in the HST mode based at least in part on a subscriber associated with the SIM card determining that a detected cell is an HST cell by any of the methods described herein.

When a UE adds a cell frequency to the NR HST frequency database, the entry may include a frequency associated with the cell (e.g., an absolute radio-frequency channel number (ARFCN)) and a timestamp indicating when the frequency was recorded. Based on this information, the UE may be able to detect a cell frequency and determine whether the frequency in an HST frequency based on its presence in the NR HST frequency database. There may be a validity timer associated with the NR HST frequency database, which may specify how long each frequency entry may be valid (e.g., considered an HST frequency). For example, an entry may be valid for an amount of time after the frequency is recorded based on the associated timestamp. In some examples, the amount of time may be configurable or tunable by a service provider associated with the UE and may be based on a velocity of the UE such that a number of cells have been traversed since adding the cell frequency.

In some cases, based on adding the cell frequency to the NR HST frequency database, the UE may add specific cell information to an NR HST cell database. The entry may include cell-specific information such as a cell global identifier (CGI), a physical cell id. (PCI), a synchronization signal block subcarrier spacing (SSB-SCS), or any combination thereof and a timestamp indicating when the information was recorded. Similarly to the NR HST frequency database, there may be a validity timer associated with the NR HST cell database, which may specify how long each cell entry may be valid (e.g., considered an HST cell) and may be configurable by a service provider. The validity timer associated with the NR HST cell database may be the same as the validity timer associated with the NR HST frequency database or may be different (e.g., may be valid for a different amount of time, or may be a separate timer, or the like). In some cases, the NR HST cell database or the NR HST frequency database may be crowdsourced based on information such as cell frequency or CGIs provided by other UE.

The HST mode UE may perform cell-based initial cell selection if the NR HST cell database (or e.g., any other database of cell identifiers) is available and may perform frequency-based initial cell selection if the NR HST frequency database (or e.g., any other database of HST cell frequencies) is available and the NR HST cell database is unavailable.

In some cases, HST mode detection may be based on a country code of the cell or a public land mobile network (PLMN) associated with the cell. For instance, the UE may determine an associated country code of PLMN and cross check the code or PLMN with a local list including all of the codes or PLMN associated with countries that have implemented HSTs and may apply the associated PRACH configurations. That is, when the PLMN of a serving cell matches one of the PLMN of the local list, for instance, then HST mode detection may be based on PRACH configuration.

In some cases, the UE may determine it is in an HST mode based on velocity data from internal inertial sensors (e.g., accelerometers or the like) or based on a velocity of the UE as determined by GPS, where the HST mode may be determined based on the UE velocity satisfying a threshold, and in some cases, based on a certainty or reliability of the velocity data.

In some examples, a UE may perform an HST cell selection procedure based on powering up or reconnecting to a network after being in airplane mode, losing service, a radio link failure, upon redirection, or returning to a RAT from another RAT after a given service (e.g., voice call) is ended, and may search an HST frequency database (e.g., NR HST frequency database, LTE HST frequency database) associated with a radio access technology (RAT) (e.g., NR, LTE) with which the UE is operating and may search starting with the most recent entries.

In some examples, the UE may be in an HST mode (e.g., the NR HST frequency database may contain at least one entry for which the associated timestamp is within the time period specified by the validity timer) and may perform an HST-biased cell selection procedure based on powering up or reconnecting to a network after being in airplane mode, losing service, or a radio link failure. For example, the UE in the HST mode may perform a cell selection procedure in which it is more likely to camp on an HST cell (biased toward HST cells).

As part of the HST-biased cell selection procedure, the UE may determine whether an NR HST cell database is available. For example, the UE may determine whether the NR HST cell database includes at least one entry for which the associated timestamp is within the time period specified by the validity timer (e.g., is valid) where the entry was included based on the UE detecting a cell associated with an SIB1 HST flag or a PRACH configuration. If the UE determines that the NR HST cell database is available the UE may search (e.g., measure frequencies of) the NR HST frequency database for a cell (e.g., a top cell) having a highest power level (e.g., in decibel-milliwatts). The UE may determine whether the power level associated with the top cell satisfies a power threshold. The power threshold may be configurable by a service provider of the UE.

In some cases, if the power level of the top cell satisfies the threshold, the UE may identify a number of other top cells that have a measured signal strength that is within a range of the top cell signal strength. For example, the UE may measure the signal strength of the top cell to be x dBm and the range may be y dB and may be tunable or configurable. The UE may identify a set of candidate cells having a signal strength greater than or equal to x-y but less than or equal to x based on searching the NR HST frequency database. The UE may search the NR HST cell database for a suitable cell in the set of candidate cells (e.g., including the top cell). The UE may determine that one cell of the set of candidate cells is a suitable cell (e.g., an HST cell) based on searching the NR HST cell database and may camp on the suitable cell. In some cases, the UE may determine that a plurality of cells of the set of candidate cells are suitable (e.g., are HST cells) and may camp on the strongest suitable cell or may camp on the first suitable cell (e.g., the first cell that is determined to be an HST cell) within the signal strength range. In such a manner, the UE may camp on an HST cell that has a lower signal strength than a non-HST top cell, thus biasing cell camping toward HST cells that may have more reliable signal quality during high mobility. In some cases, the UE may determine that no cells of the set of candidate cells are HST cells based on searching the NR HST cell database and may search the NR HST frequency database for a suitable cell. The UE may camp on a cell having a strongest signal strength based on searching the NR HST frequency database.

In some other cases, the power level of the strongest cell may be less than the power level threshold and the UE may search the NR HST frequency database as well as other (e.g., non-HST) frequencies for a suitable cell. The UE may camp on a cell having a strongest signal strength based on the searching. In such a way, the UE may be biased toward selecting an HST cell based on first searching the NR HST frequency database for a suitable cell even though the NR HST frequency database may include non-HST cells.

Based on determining that the UE is in the HST mode, the UE may determine that the NR HST cell database is unavailable (e.g., the NR HST cell database is empty or expired), the UE may search the NR HST frequency database and may identify a cell that is associated with a frequency recorded in the NR HST frequency database having a strongest signal. The UE may camp on the identified cell based on the NR HST frequency database and the signal strength. In such a way, the UE may be biased toward selecting an HST cell based on first searching the NR HST frequency database for a suitable cell. In some cases, the UE may not identify a suitable cell associated with an HST frequency (e.g., a frequency recorded in the NR HST frequency database) and may search other (e.g., non-HST) frequencies for a suitable cell. The UE may camp on a cell having a strongest signal strength based on searching other non-HST frequencies.

In some other examples, the UE may determine it is in a non-HST mode and may follow a different cell selection procedure which may give preference to a cell with a strongest signal strength independent of deployment mode rather than giving preference to an HST cell. For example, the UE may perform cell selection based on a number of cell selection procedures associated with a low speed deployment.

In some examples, a UE may perform an HST cell selection procedure based on powering up or reconnecting to a network after being in airplane mode, losing service, or a radio link failure and may search an HST frequency database (e.g., NR HST frequency database, LTE HST frequency database) associated with the RAT (e.g., NR, LTE) with which the UE is operating and may search starting with the most recent entries.

In some examples, the UE may be in an HST mode and may perform an HST-biased cell reselection procedure based performing a cell selection procedure. For example, the UE in the HST mode may perform a cell reselection procedure in which it is more likely to camp on (or reselect) another HST cell. For example, the HST mode UE may have previously selected an HST serving cell that had a measured power level less than a power level of a non-HST candidate cell. Based on the serving HST cell having a lower measured power level, the UE may apply an offset (e.g., a power offset such as Delta-RSRP) to the measured power level of the serving HST cell when performing cell reselection.

For example, the top cell list may include cell A, cell B, and cell C. Where cell A has the strongest measured power level, cell C has the weakest measured power level, and cell B is an HST cell has a power level between power levels A and C. For example, cell B may be x dB weaker than cell A and thus the UE may apply an x dB offset to the power level of cell B (and, for example, any other measured HST cells) such that when it performs the cell reselection procedure, the UE is more likely to select (or remain on) cell B (or any other HST cell). In some examples, the UE may apply the offset in a radio resource control (RRC) idle mode or an RRC inactive mode. In this way, the UE may refrain from switching to a non-HST cell while the serving HST cell is still suitable or if there are other suitable HST cells.

In some cases, the UE may perform Intra-RAT cell reselection or Inter-RAT cell reselection and may apply the offset to cells in the NR HST cell database. When the UE performs Inter-RAT cell reselection, LTE HST frequencies may be given a higher priority (e.g., may be searched first, may be applied with a bias, or the like) than LTE non-HST frequencies (e.g., in NR SIB5), and NR HST frequencies may be given a higher priority (e.g., may be searched first, may be applied with a bias, or the like) than NR non-HST frequencies (e.g., in LTE SIB24). In some cases, the UE may perform Inter-frequency cell reselection and may apply the offset to cells in the NR HST frequency database. For example, the UE may apply the offset when reselecting from a first frequency band (FR1, FR2, FR3, etc.) to any other available frequency band (FR1, FR2, FR3).

In some examples, the UE may be in an HST mode and may perform an HST-biased handover procedure based performing a cell selection procedure. For example, the UE in the HST mode may be indicated to perform a handover procedure in which it is more likely to handover to another HST cell. For example, the HST mode UE may have previously selected an HST serving cell that had a measured power level less than a power level of a non-HST candidate cell. Based on the serving HST cell having a lower measured power level, the UE may apply an offset (e.g., a power offset such as Delta-RSRP) to the measured power level of the serving HST cell and any other HST cells while in a connected mode (e.g., an RRC connected mode). The UE may transmit the measured values to the network such that the network is more likely to select a suitable HST cell for handover based on the HST cell power level values being positively biased.

The outlined methods for biasing HST cells for cell selection, reselection or handover may be realized to implement one or more advantages. For example, (re)selecting a suitable HST over a non-HST cell with comparable power levels or signal strengths or both may allow a UE to camp on a cell with higher reliability due to TRPs spread throughout the HST cell. That is, a UE may experience higher mobility support based on camping on the HST cell.

Aspects of the disclosure are initially described in the context of wireless communications systems. Aspects of the disclosure are further described in the context of another wireless communications system, selection, reselection, and handover flowcharts, as well as process flows. Aspects of the disclosure are further illustrated by and described with reference to apparatus diagrams, system diagrams, and flowcharts that relate to techniques for biasing cell camping in high-speed UE deployment.

FIG. 1 illustrates an example of a wireless communications system that supports techniques for biasing cell camping in high-speed UE deployment in accordance with various aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of T, $=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FRE or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some examples, a UE 115 may initiate a cell selection procedure to connect to a network 130 based on powering up, being in a reduced capability mode, being out of service, based on a radio link failure, or performing a fast return procedure. The UE 115 may determine it is in an HST mode and may search an HST frequency database (e.g., NR HST frequency database, LTE HST frequency database) associated with a RAT (e.g., NR, LTE) within which the UE 115 is operating and may search starting with the most recent entries.

In some examples, the UE 115 may determine it is in an HST mode (e.g., the NR HST frequency database may contain at least one entry for which the associated timestamp is within the time period specified by the validity timer) based on a trigger received from a base station 105 or a TRP 145 associated with a first cell indicating that the cell is an HST cell. The UE 115 may perform an HST-biased cell selection procedure based on identifying the trigger received in the indication. For example, the UE 115 in the HST mode may perform a cell selection procedure in which it is more likely to camp on an HST cell.

In some other examples, the UE 115 may determine it is in a non-HST mode and may follow a different cell selection procedure which may give preference to a cell with a strongest signal strength independent of deployment mode rather than giving preference to an HST cell. For example, the UE 115 may perform cell selection based on a number of cell selection procedures associated with a low speed deployment.

Figure 2:
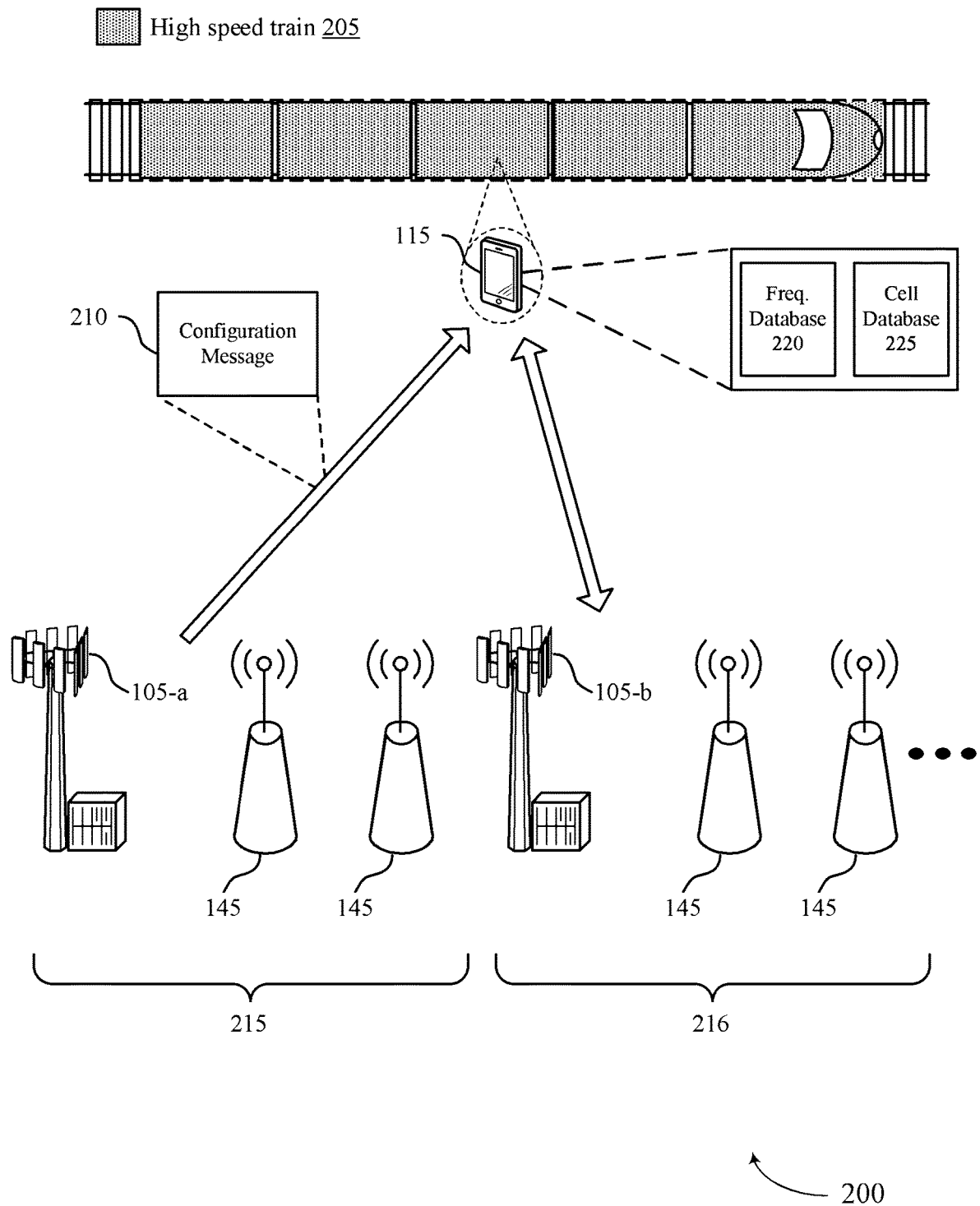
FIG. 2 illustrates an example of a wireless communications system that supports techniques for biasing cell camping in high-speed UE deployment in accordance with various aspects of the present disclosure.

FIG. 2 illustrates an example of a wireless communications system that supports techniques for biasing cell camping in high-speed UE deployment in accordance with various aspects of the present disclosure. In some examples, wireless communications system 200 may implement aspects of wireless communications system 100. The wireless communications system 200 includes a base station 105-a, a UE 115, and TRPs 145 which may be examples of the corresponding devices of FIG. 1. In some example implementations, the TRPs 145 may be referred to as repeaters. The wireless communications system 200 may also include a HST 205, which may carry any number of UEs 115. TRPs 145 may serve the same geographic coverage area, or different geographic coverage areas. The TRPs 145 may positioned along the train track in a manner to provide a continuous or near continuous coverage area for UEs 115 of the HST 205 and assist UEs 115 in maintaining steady coverage when traveling within an HST cell.

The UE 115 may determine that it is operating in a high-speed environment based on a number of triggers or indications and may opt to select an HST cell which may have better signal quality during high mobility instances than a non-HST cell. For example, the UE 115 may receive configuration message 210 from a base station 105-a that includes network configurations or flags that indicate the associated cell 215 is an HST cell and the UE 115 may determine it is in an HST mode based on receiving this information. In some examples, the UE 115 may determine it is in the HST mode based on proprietary methods of detection including sensor information, Doppler measurements, frequency measurements, or the like.

There may be a number of conditions (e.g., triggers, indications, sensor data, or the like) associated with HST cells that the UE 115 may detect and based on these conditions may determine that it is in the HST mode. In one example, the base station 105-a in cell 215 may detect a frequency jump associated with the UE 115 and may transmit an indication to the UE 115 in the configuration message 210. The indication may be set to TRUE when the frequency jump satisfies a threshold and may be set to FALSE when the frequency jump does not satisfy the threshold or if the base station 105-a does not detect a frequency jump. The UE 115 may determine that it is in the HST mode when the indication is set to TRUE and may add the frequency of the cell 215 to a database of NR HST frequencies 220. While travelling, the UE 115 may detect a number of cell frequencies and may add each frequency to the NR HST frequency database 220 while the UE 115 is in the HST mode (e.g., while the indication is set to TRUE). In some cases, the NR HST frequency database 220 may be valid for cell selection for a time (e.g., minutes) during which the UE 115 may consider the frequencies to be HST cell frequencies. In such cases, the UE 115 may generally determine that a frequency of the NR HST frequency database 220 is associated with an HST cell but may be unable to identify if specific cells on the frequency are HST cells. For example, the NR HST frequency database may include the operating frequency of HST cell 215. The UE may detect second cell 216 and determine that the associated frequency is in the frequency database 220 but may be unable to identify if the second cell 216 is an HST cell even though it is operating on an HST frequency. In other words, UE 115 may add the frequency of the HST cell 215 to the NR HST frequency database 220 and may detect a second cell 216 on the same frequency. The second cell 216 may be an HST cell or may be a non-HST cell.

In some other examples, the UE 115 may receive system information (e.g., system information block (SIB) 1 (SIB1)) from base station 105-a that includes an HST-specific configuration or HST flag. For example, the SIB1 may include a PRACH configuration for HST or may include an SIB1 HST flag. Based on receiving the system information (e.g., SIB1) indicating the cell 215 is an HST cell, the UE 115 may add the frequency of the cell 215 to the NR HST frequency database 220, which may be valid for a period of time. The UE 115 may also add information associated with the cell 215 to an NR HST cell database 225 based on receiving the system information (e.g., including information identifying the cell 215 in addition to the frequency associated with the cell 215). In other words, the UE 115 may add the frequency of the HST cell 215 to the NR HST frequency database 220 and may add the cell-specific information of the HST cell 215 to the NR HST cell database 225. The UE 115 may detect a second cell 216 on the same frequency and may be able to determine whether the second cell is an HST cell by searching for the frequency associated with the second cell 216 in the NR HST frequency database 220 and by searching for cell-specific information associated with the second cell 216 in the NR HST cell database 225. The UE may determine the second cell 216 is an HST cell based on entries associated with the second cell 216 being present in both databases 220 and 225.

In some other examples, the UE 115 may be served by an LTE cell 215 and may receive system information (e.g., SIB2) in configuration message 210 that includes an HST flag. The UE 115 may perform handover or reselection to second cell 216 while camped on the HST LTE serving cell 215 and may add any detected NR cell frequencies to the NR HST frequency database based on the HST status of the LTE cell (e.g., the frequency associated with the second cell 216). In this way, the UE 115 may carry over or remain in the HST mode during inter-RAT transitions.

In yet other examples, the UE 115 may include a plurality of SIM cards, any one of which may detect one of the HST mode conditions described herein. The UE may determine it is in the HST mode based at least in part on a subscriber associated with the SIM card determining that a detected cell (e.g., cell 215, second cell 216 or the like) is an HST cell by any of the methods described herein.

When the UE 115 adds a cell frequency to the NR HST frequency database 220, the entry may include a frequency associated with the cell (e.g., an absolute radio-frequency channel number (ARFCN)) and a timestamp indicating when the frequency was recorded. Based on this information, the UE 115 may be able to detect a cell frequency and determine whether the frequency in an HST frequency based on its presence in the NR HST frequency database 220. There may be a validity timer associated with the NR HST frequency database 220, which may specify how long each frequency entry may be valid (e.g., considered an HST frequency). For example, an entry may be valid for an amount of time after the frequency is recorded based on the associated timestamp. In some examples, the amount of time may be configurable or tunable by a service provider associated with the UE 115 and may be based on a velocity of the HST 205 such that a number of cells have been traversed since adding the cell frequency.

In some cases, based on adding the cell frequency to the NR HST frequency database 220, the UE 115 may add specific cell information to the NR HST cell database 225. The entry may include cell-specific information such as a cell global identifier (CGI), a physical cell ID (PCI), a synchronization signal block subcarrier spacing (SSB-SCS), or any combination thereof and a timestamp indicating when the information was recorded. Similarly to the NR HST frequency database 220, there may be a validity timer associated with the NR HST cell database 225, which may specify how long each cell entry may be valid (e.g., considered an HST cell) and may be configurable by a service provider of the UE 115. The validity timer associated with the NR HST cell database 225 may be the same as the validity timer associated with the NR HST frequency database 220 or may be different (e.g., may be valid for a different amount of time, or may be a separate timer, or the like). In some cases, the NR HST cell database 225 or the NR HST frequency database 220 may be crowdsourced based on information such as cell frequency or CGIs provided by other UE 115.

In some cases, HST mode detection may be based on a country code of the cell (e.g., cell 215 or second cell 216 or the like) or a public land mobile network (PLMN) associated with the cell (e.g., cell 215 or second cell 216 or the like). For instance, the UE 115 may determine an associated country code of PLMN and cross check the code or PLMN with a local list including all of the codes or PLMN associated with countries that have implemented HSTs and may apply the associated PRACH configurations. That is, when the PLMN of a serving cell (e.g., cells 215 or second cell 216 or the like) matches one of the PLMN of the local list, for instance, then HST mode detection may be based on the associated PRACH configuration.

In some cases, the UE 115 may determine it is in an HST mode based on velocity data from internal inertial sensors (e.g., accelerometers or the like) or based on a velocity of the UE 115 as determined by GPS, where the HST mode may be determined based on the velocity satisfying a threshold, and in some cases, based on a certainty or reliability of the velocity data.

In some examples, the UE 115 may perform an HST cell selection procedure based on powering up or reconnecting to a network after being in airplane mode, losing service, or a radio link failure and may search an HST frequency database (e.g., NR HST frequency database, LTE HST frequency database) associated with the RAT (e.g., NR, LTE) with which the UE is operating and may search starting with the most recent entries.

In some examples, the UE 115 may determine it is in the HST mode (e.g., the NR HST frequency database 220 may contain at least one entry for which the associated timestamp is within the time period specified by the validity timer) and may perform an HST-biased cell selection procedure based on powering up or reconnecting to a network after being in airplane mode, losing service, or a radio link failure among other examples. The UE 115 in the HST mode may perform a cell selection procedure in which it is more likely to camp on an HST cell.

Figure 3:
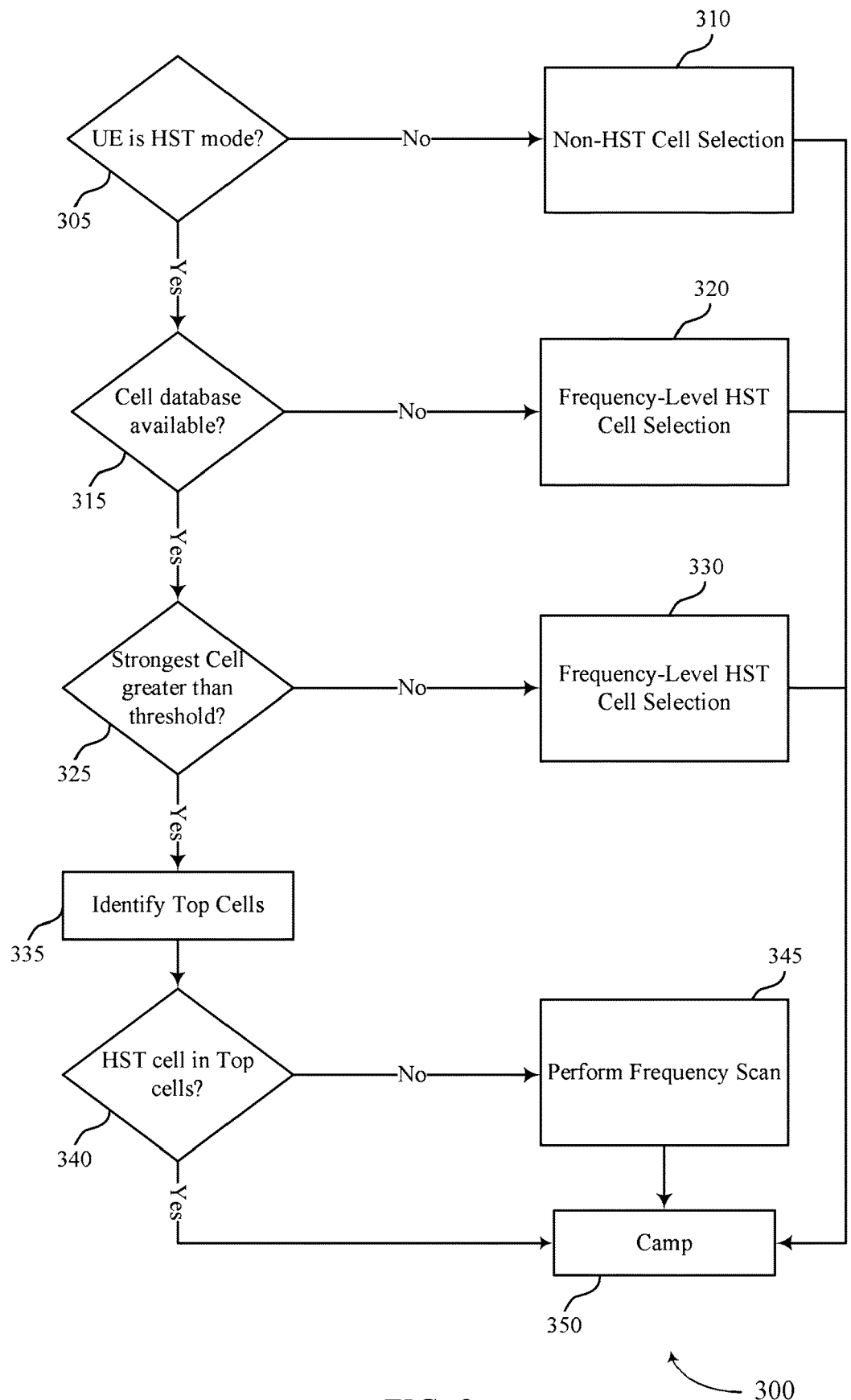
FIG. 3 illustrates an example of a flowchart that supports techniques for biasing cell camping in high-speed UE deployment in accordance with various aspects of the present disclosure.

FIG. 3 illustrates an example of a flowchart that supports techniques for biasing cell camping in high-speed UE deployment in accordance with various aspects of the present disclosure. The operations of flowchart 300 may be implemented by a UE 115 or its components as described herein. For example, the operations of flowchart 300 may be performed by a UE 115 as described with reference to FIGS. 1 and 2. In some examples, a UE 115 may execute a set of instructions to control the functional elements of the UE 115 to perform the described functions. Additionally or alternatively, a UE 115 may perform aspects of the functions described herein using special-purpose hardware.

At 305, the UE 115 may determine whether the UE 115 is in an HST mode according to one or more conditions as described with reference to FIG. 2.

In some examples, at 305, the UE 115 may determine it is in a non-HST mode and, at 310, may follow a different cell selection procedure which may select a cell with a strongest signal strength independent of deployment mode rather than biasing toward an HST cell. For example, the UE 115 may perform cell selection based on a number of cell selection procedures associated with a low speed deployment and at 350 may select a cell to camp on based on signal strength.

If the UE is in an HST mode, then at 315, the UE 115 may determine whether an NR HST cell database is available. For example, the UE 115 may select from one of a cell-based initial cell selection or a frequency-based initial cell selection. For example, the UE 115 may determine whether the NR HST cell database includes at least one entry for which the associated timestamp is within the time period specified by the validity timer (e.g., is valid) where the entry was included based on the UE 115 detecting a cell associated with an SIB1 HST flag or a PRACH configuration.

Based on determining that the UE 115 is in the HST mode, at 315, the UE may determine that the NR HST cell database is unavailable (e.g., the NR HST cell database is empty or expired), and perform a frequency-based initial cell selection. As part of the frequency-based initial cell selection, at 320, the UE 115 may search the NR HST frequency database and may identify a cell that is associated with a frequency recorded in the NR HST frequency database having a strongest signal. At 350, the UE 115 may camp on the identified cell based on the NR HST frequency database and the signal strength based on the frequency-based initial cell selection. In such a way, the UE 115 may be biased toward selecting a cell on an HST frequency based on first searching the NR HST frequency database for a suitable cell. In some cases, the UE 115 may not identify a suitable cell associated with an HST frequency (e.g., a frequency recorded in the NR HST frequency database) and may search other (e.g., non-HST) frequencies for a suitable cell. At 350, the UE 115 may camp on a cell having a strongest signal strength based on searching other non-HST frequencies.

If the UE 115 determines that the NR HST cell database is available the UE 115 may perform a cell-based initial selection procedure. As part of the cell-based initial cell selection, the UE 115 may search (e.g., measure frequencies of) the NR HST frequency database for a cell (e.g., a top cell) having a highest power level (e.g., in decibel-milliwatts), and at 325, the UE 115 may determine whether the power level associated with the top cell satisfies a power threshold. The power threshold may be configurable by a service provider of the UE 115.

In some cases, the UE 115 may determine that the power level of the strongest cell may be less than the power level threshold and, at 330, the UE 115 may search the NR HST frequency database as well as other (e.g., non-HST) frequencies for a suitable cell. The UE 115 may, at 350, camp on a cell having a strongest signal strength based on the searching and the cell-based initial cell selection. In such a way, the UE 115 may be biased toward selecting an HST cell based on first searching the NR HST frequency database for a suitable cell.

In some cases, if the power level of the top cell satisfies the threshold, at 335, the UE 115 may identify a number of other top cells that have a measured signal strength that is within a range of the top cell signal strength. For example, the UE 115 may measure the signal strength of the top cell to be x dBm and the range may be y dB which may be tunable or configurable by the service provider. The UE 115 may identify a set of candidate cells having a signal strength greater than or equal to x-y but less than or equal to x based on searching the NR HST frequency database.

At 340, the UE 115 may search the NR HST cell database for a suitable cell in the set of candidate cells (e.g., including the top cell). The UE 115 may determine that one cell of the set of candidate cells is a suitable cell (e.g., an HST cell) based on searching the NR HST cell database and at 350, may camp on the suitable cell. In some cases, the UE 115 may determine that a plurality of cells of the set of candidate cells are suitable (e.g., are HST cells) and may camp on the strongest suitable cell or may camp on the first suitable cell (e.g., the first cell that is determined to be an HST cell) within the signal strength range.

In such a manner, the UE 115 may camp on an HST cell that has a lower signal strength than a non-HST top cell, thus biasing cell camping toward HST cells that may have more reliable signal quality during high mobility.

In some cases, at 340, the UE 115 may determine that no cells of the set of candidate cells are HST cells based on searching the NR HST cell database and at 345 may search the NR HST frequency database for a suitable cell. At 350, the UE 115 may camp on a cell having a strongest signal strength based on searching the NR HST frequency database.

The outlined methods for biasing HST cells for cell selection may be realized to implement one or more advantages. For example, selecting a suitable HST over a non-HST cell with comparable power levels or signal strengths or both may allow the UE 115 to camp on a cell with higher reliability due to TRPs spread throughout the HST cell. That is, the UE 115 may experience higher mobility support based on initially camping on the HST cell.

Figure 4:
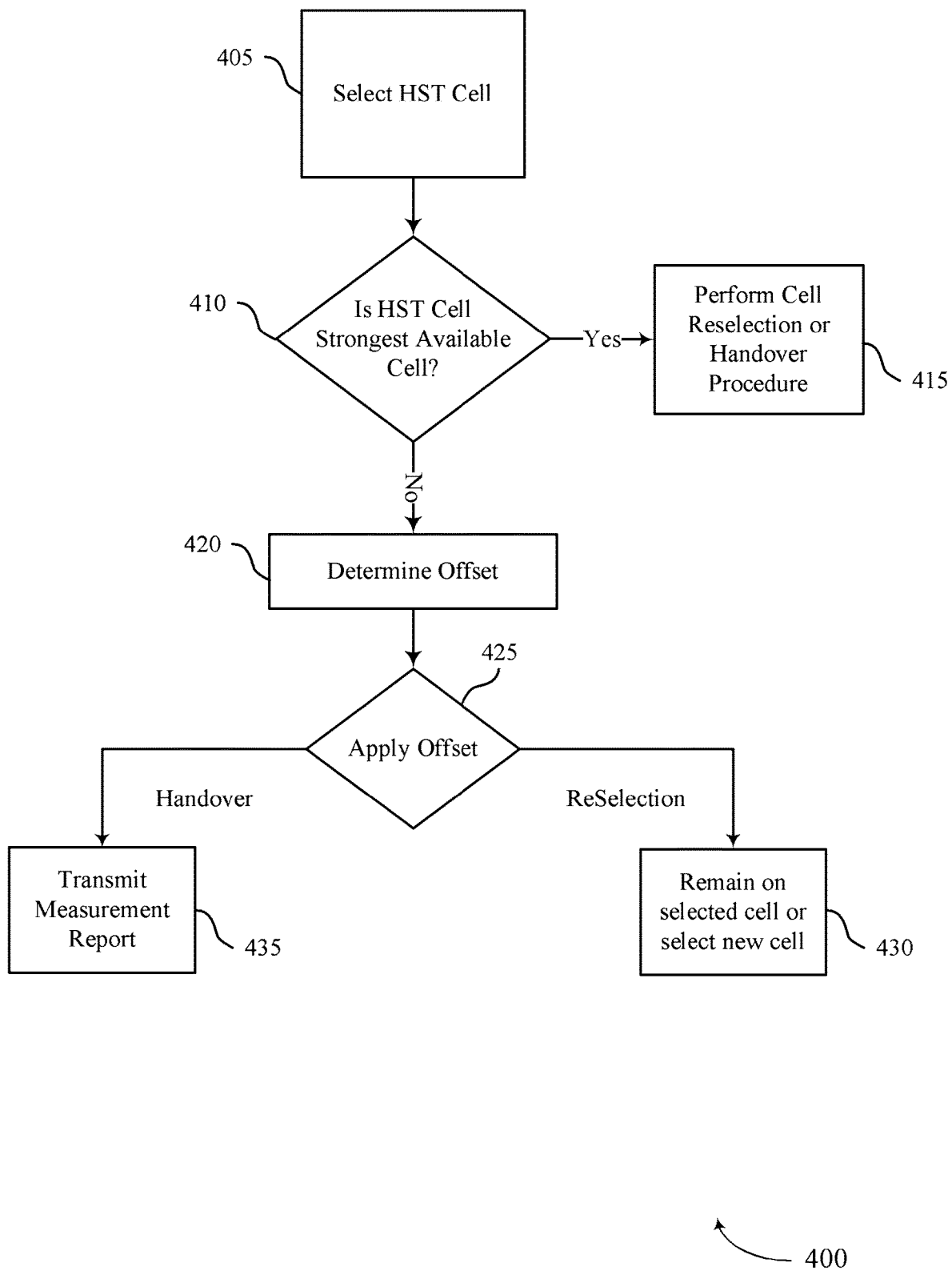
FIG. 4 illustrates an example of a flowchart that supports techniques for biasing cell camping in high-speed UE deployment in accordance with various aspects of the present disclosure.

FIG. 4 illustrates an example of a flowchart that supports techniques for biasing cell camping in high-speed UE deployment in accordance with various aspects of the present disclosure. The operations of flowchart 400 may be implemented by a UE 115 or its components as described herein. For example, the operations of flowchart 400 may be performed by a UE 115 as described with reference to FIGS. 1 and 2. In some examples, a UE 115 may execute a set of instructions to control the functional elements of the UE 115 to perform the described functions. Additionally or alternatively, the UE 115 may perform aspects of the functions described herein using special-purpose hardware.

The UE 115 may be in an HST mode and may initiate an HST-biased cell reselection procedure based on selecting an HST cell according to one or more aspects as described with reference to FIG. 3. For example, the UE 115 in the HST mode may initiate a cell reselection procedure in which the UE 115 is more likely to camp on (or reselect) another HST cell. For example, at 405 the UE 115 select an HST serving cell and at 410 may determine that whether the serving HST serving cell is the strongest cell among a number of cells including one or more neighboring cells. If yes, the UE 115 remains on the HST serving cell. If not and the UE 115 determines that serving cell has a measured power level less than a power level of one or more neighboring cells. Based on the serving HST cell having a lower measured power level, at 420, the UE 115 may determine an offset or bias for applying to HST cells. For example, the top cell list as described with reference to FIG. 3 may include cell A, cell B, and cell C, where cell A has the strongest measured power level, cell C has the weakest measured power level, and cell B is an HST cell has a power level between power levels A and C. For example, cell B may be the selected cell and may be z dB weaker than cell A and thus the UE 115 may determine a z dB offset (e.g., a power offset such as Delta-RSRP).

At 425, the UE 115 may apply the offset (e.g., the power offset such as Delta-RSRP) to the measured power level of the serving HST cell and any other neighboring cells that are HST cells. For example, the UE may apply an z dB offset to the power level of cell B (and, for example, any other measured HST cells). Applying offsets to HST cells may bias HST cells over non-HST cells when determining whether to perform handover or reselection from the serving HST cell to another cell. For example, when a UE determines to perform cell reselection at 430, the UE 115 is more likely to select (or remain on) cell B (or reselect another HST cell of the neighboring cells). In this way, the UE 115 may refrain from switching to a non-HST cell while the serving HST cell is still suitable or if there are other suitable HST cells of the neighboring cells.

In some examples, at 425, the UE 115 may apply the offset (e.g., the power offset such as Delta_RSRP) to the measured power level of the serving HST cell (e.g., cell B) and any other HST cells of the neighboring cells while in a connected mode (e.g., RRC_CONNECTED mode) and may determine to perform an HST-biased handover procedure. For example, at 435, the UE may transmit a measurement report to the network including the biased HST cell values such that the network is more likely to select an HST cell as the target cell for the UE 115 for handover based on the HST cell power level values being biased in accordance with the offset(s) applied at 425.

After applying offset(s) at 425, the UE 115 may determine to perform handover and transmit a measurement report at 435, as described herein, or may determine whether to perform cell reselection at 430. For example, the UE 115 may determine to remain on the HST serving cell or reselect an HST cell of the neighboring cells based on the biased values associated with the HST serving cell and the HST cells of the neighboring cells. For example, after offset(s) are applied to HST cells at 425, a UE 115 may determine that a neighboring HST cell is more suitable (e.g., may have a higher measured value after the applied offset than the serving cell after the applied offset) and may reselect the neighboring HST cell for subsequent communications.

The outlined methods for biasing HST cells for cell reselection or handover may be realized to implement one or more advantages. For example, reselecting a suitable HST cell over a non-HST cell with comparable power levels, or signal strengths, or both, may allow the UE 115 to camp on a cell with higher reliability due to TRPs spread throughout the HST cell. That is, UE 115 may experience higher mobility support based on reselecting or handing over to an HST cell.

Figure 5:
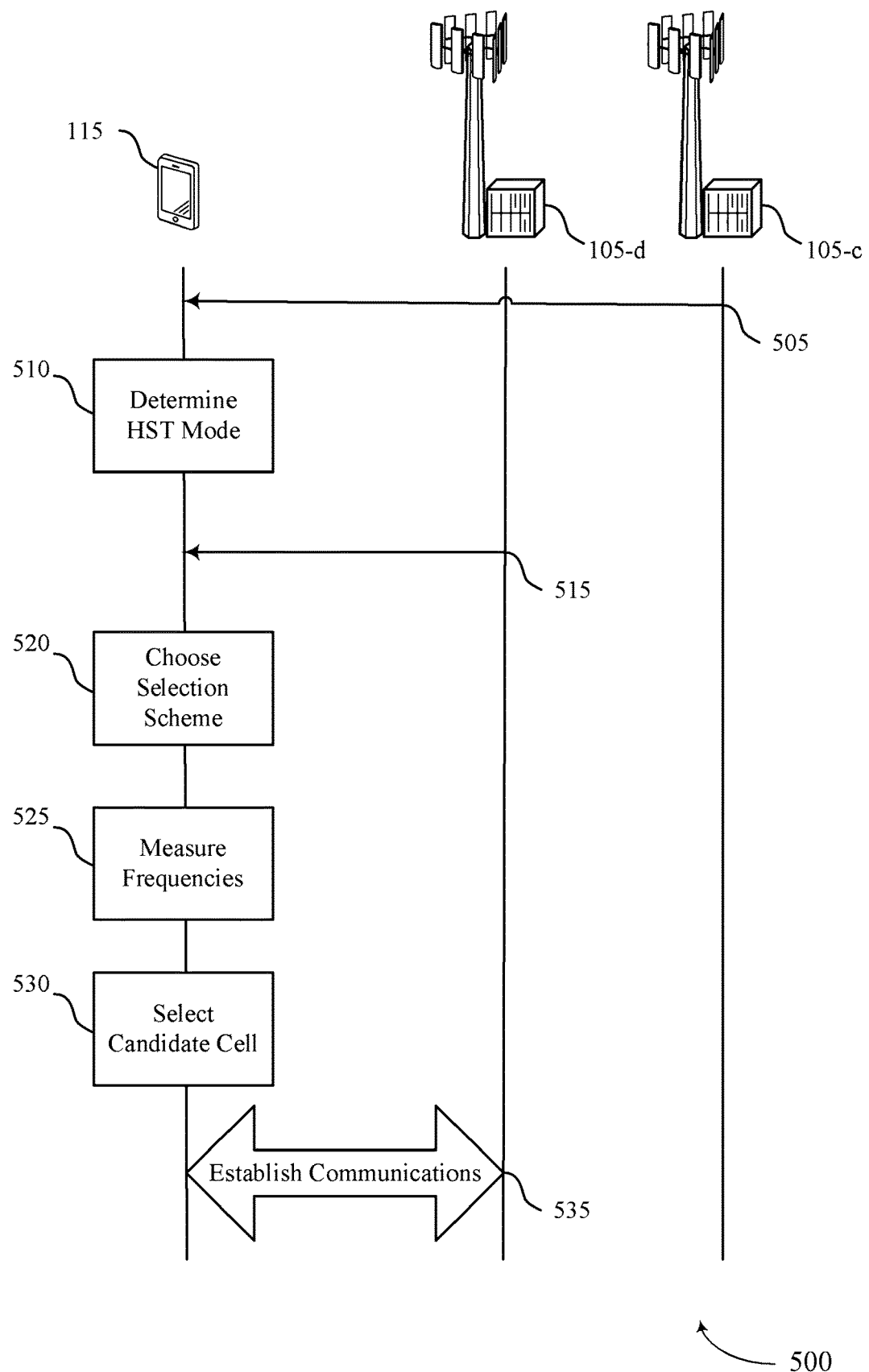
FIG. 5 illustrates an example of a process flow that supports techniques for biasing cell camping in high-speed UE deployment in accordance with various aspects of the present disclosure.

FIG. 5 illustrates an example of a process flow that supports techniques for biasing cell camping in high-speed UE deployment in accordance with various aspects of the present disclosure. In some examples, process flow 500 may implement aspects of wireless communications systems 100 and/or 200. Process flow 500 may be implemented by UE 115, base station 105-c that is associated with a first cell and base station 105-d that is associated with a second cell, each of which may be examples of the corresponding device described herein. Alternative examples of the following may be implemented, where some steps are performed in a different order than described or are not performed at all. In some cases, steps may include additional features not mentioned below, or further steps may be added.

At 505, the UE 115 may receive an indication of a first deployment mode from a base station 105-c associated with a first cell. For example, the UE 115 may receive an indication that one of a number of conditions (e.g., triggers, indications, sensor data, or the like) associated with HST cells are satisfied. In one example, base station 105-c may detect a frequency jump associated with the UE 115 and may transmit a frequency jump indication to the UE 115. The indication may be set to TRUE when the frequency jump satisfies a threshold and may be set to FALSE when the frequency jump does not satisfy the threshold or if the base station 105-x does not detect a frequency jump. In some other examples, at 505, the UE 115 may receive system information (e.g., SIB1) that includes an HST-specific configuration or an HST flag. For example, the base station 105-c may be associated with a first RAT (e.g., NR) and may transmit SIB1 including an HST-specific PRACH configuration or including an SIB1 HST flag. In some other examples, at 505, the base station 105-c may be associated with a second RAT (e.g., LTE) and may transmit system information (e.g., SIB2) that includes an HST flag. In yet other examples, at 505, a UE 115 may include a plurality of SIM cards, any one of which may detect one of the HST mode conditions described herein (e.g., based on the received indication).

At 510, the UE 115 may determine it is in the HST mode based at least in part on receiving the indication that one of the HST conditions is satisfied for the first cell associated with the base station 105-c. For example, the UE may determine that it is in the HST mode when the received frequency jump indication is set to TRUE, when SIB1 include an HST-specific PRACH configuration or an HST flag, when SIB2 includes an HST flag, among other examples. The UE 115 may detect a number of cell frequencies while in the HST mode and may add each frequency to a database of NR HST frequencies while the UE is in the HST mode (e.g., while the indication is set to TRUE, after receiving the HST-specific PRACH configuration, the HST flag, or the like). For example, at 510, the UE 115 may determine the HST mode and may add the frequency of the first cell associated with base station 105-c to the NR HST frequency database described herein, which may be valid for a period of time and in some cases may also add information associated with the cell to an NR HST cell database, for example, based on receiving system information (e.g., SIB1 including information identifying the specific cell in addition to an associated frequency).

In some cases, the NR HST frequency database, the NR HST cell database, or both may be valid for cell selection for a time (e.g., minutes) during which the UE 115 may consider the database entries to be HST entries. For example, the UE 115 may determine that a frequency of the NR HST frequency database is associated with an HST cell but may be unable to identify if specific cells on the frequency are HST cells and may refer to the NR HST cell database for more information, if available. For example, at 510, the UE 115 may have added the frequency of the first cell associated with the base station 105-c to the NR HST frequency database and, at 515, may detect a second cell associated with base station 105-d on the same frequency. The second cell may be an HST cell or a non-HST cell based solely on the frequency database. The UE 115 may refer to the NR HST cell database, if available, to further determine whether the second cell is an HST cell.

At, 520 based on determining that the UE 115 is in the HST mode, the UE 115 may proceed with a cell selection procedure. For example, the UE 115 may determine whether the NR HST frequency database is available (e.g., contains at least one entry for which the associated timestamp is within the time period specified by the validity timer). If the NR HST frequency database is available, the UE 115 may perform an HST-biased cell selection procedure based on powering up or reconnecting to a network after being in airplane mode, losing service, or a radio link failure. For example, the UE 115 in the HST mode may perform a cell selection procedure in which it is more likely to camp on an HST cell (biased toward HST cells). If the NR HST frequency database is unavailable, the UE 115 may perform an unbiased cell selection procedure which may result in selecting a cell with a strongest signal strength independent of deployment mode rather than biasing toward an HST cell.

The UE 115, at 520, may further determine whether an NR HST cell database is available. For example, the UE 115 may determine whether the NR HST cell database includes at least one entry for which the associated timestamp is within the time period specified by the validity timer (e.g., is valid) where the entry was included based on the UE 115 detecting a cell associated with an SIB1 HST flag or a PRACH configuration and may perform a first HST-biased cell selection procedure. In some examples, the UE 115 may determine that the NR HST cell database is unavailable (e.g., the NR HST cell database is empty or expired) and may perform a second HST-biased cell selection procedure.

At 525, the UE 115 may measure frequencies of one or more neighboring (e.g., detectable) cells, including the second cell associated with the base station 105-d as part of the first HST-biased cell selection procedure or the second HST-biased cell selection procedure as described with reference to FIGS. 2 and 3.

At 530, the UE 115 may select the second cell associated with the base station 105-d based on the availability of the NR HST frequency database and the NR HST cell database and the frequency measurements of the one or more neighboring cells and at 535 may establish communications with the base station 105-d.

Figure 6:
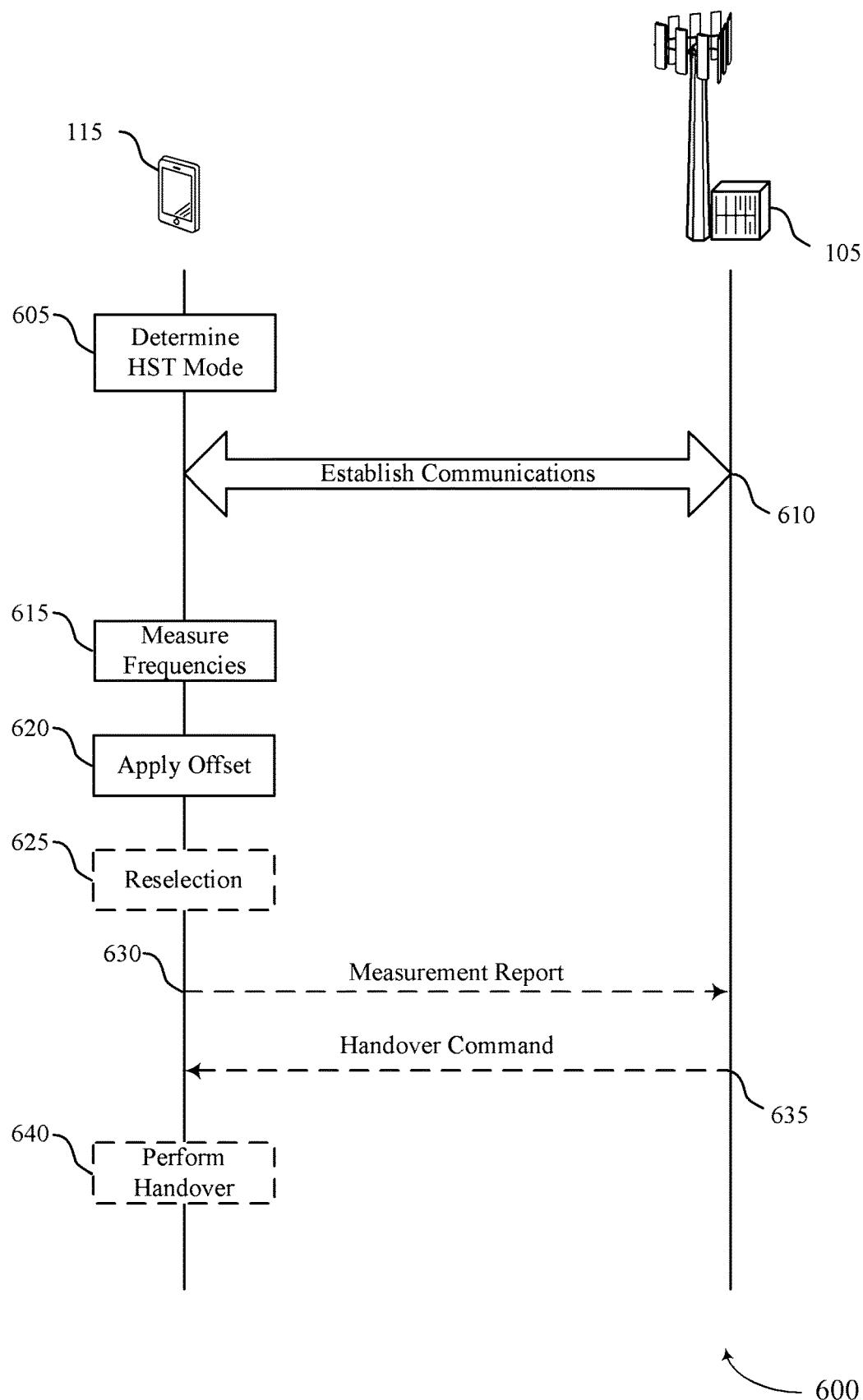
FIG. 6 illustrates an example of a process flow that supports techniques for biasing cell camping in high-speed UE deployment in accordance with various aspects of the present disclosure.

FIG. 6 illustrates an example of a process flow that supports techniques for biasing cell camping in high-speed UE deployment in accordance with various aspects of the present disclosure. In some examples, process flow 600 may implement aspects of wireless communications systems 100 and/or 200. Process flow 600 may be implemented by UE 115 and base station 105-e that is associated with a first cell, each of which may be examples of the corresponding device described herein. Alternative examples of the following may be implemented, where some steps are performed in a different order than described or are not performed at all. In some cases, steps may include additional features not mentioned below, or further steps may be added.

At 605, the UE 115 may determine it is in the HST mode based at least in part on an indication that one of a plurality of conditions is satisfied for the first cell associated with the base station 105-e. For example, the UE 115 may identify that a condition for indicating the first deployment mode (e.g., HST mode) associated with the first cell is met. For example, the UE 115 may determine that one of a number of conditions (e.g., triggers, indications, sensor data, or the like) associated with HST cells is satisfied. In one example, UE 115 may detect a frequency jump associated with the UE 115 and may transmit a frequency jump indication to the base station 105-d. The indication may be set to TRUE when the frequency jump satisfies a threshold and may be set to FALSE when the frequency jump does not satisfy the threshold or if the UE 115 does not detect a frequency jump. In some other examples, the UE 115 may identify system information (e.g., SIB1) that includes an HST-specific configuration or an HST flag. For example, the base station 105-e may be associated with a first RAT (e.g., NR) and may transmit SIB1 including an HST-specific PRACH configuration or including an SIB1 HST flag. In some other examples, the base station 105-e may be associated with a second RAT (e.g., LTE) and may transmit system information (e.g., SIB2) that includes an HST flag. In yet other examples, the UE 115 may include a plurality of SIM cards, any one of which may detect one of the HST mode conditions described herein (e.g., based on the received indication).

At 610, the UE 115 may select the first cell associated with the base station 105-e according to one or more HST-biased selection procedures as described with reference to FIGS. 3 and 5 and may establish a connection with the base station 105-e based part on selecting the first cell associated with the HST mode.

At 615, the UE 115 may perform measurements of frequencies associated with one or more neighboring cells and the frequency of the first cell associated with the base station 105-e and may determine a measured power difference between a highest measured power level of the one or more neighboring cells and the measured power level of the first cell. For example, the UE 115 may measure an offset (e.g., power differential, Delta_RSRP, or the like) and, at 620, may apply (e.g., add) the offset to the measured frequency values of a subset of the one or more neighboring cells and to the measured value of the first cell so that the UE 115 is more likely to handover or reselect an HST cell. In some examples, the subset of the one or more neighboring cells includes cells that have been identified as HST cells based on the frequency database and the cell database described herein.

At 625, in some cases, the UE 115 may perform Intra-RAT cell reselection or Inter-RAT cell reselection based on applying the offset to the subset of cells and the first cell (e.g., cells in the NR HST cell database). When the UE performs Inter-RAT cell reselection, LTE HST frequencies may be given a higher priority (e.g., may be searched first, may be applied with a bias, or the like) than LTE non-HST frequencies (e.g., in NR SIB5), and NR HST frequencies may be given a higher priority (e.g., may be searched first, may be applied with a bias, or the like) than NR non-HST frequencies (e.g., in LTE SIB24). In some cases, the UE may perform Inter-frequency cell reselection based on applying the offset to cells in the NR HST frequency database. In some examples, the UE 115 may perform intra-frequency cell reselection in which the UE is configured with a first carrier within a frequency band (e.g., FR1) and selects a second carrier within the same frequency band. Inter-frequency cell reselection may be performed by the UE 115 in which the UE may apply the offset to one or more cells in the NR HST frequency database. For example, the UE 115 may apply the offset to HST frequency measurements when reselecting from a first frequency band (FR1, FR2, FR3, etc.) to any other available frequency band (FR1, FR2, FR3, etc.).

At 630, in some other cases, the UE may transmit the set of adjusted measurements to the base station 105-e. The base station 105-e may select a cell for handover with a highest apparent power level based on the offset measurement values and may be more likely to select an HST cell based on the applied offset in the measurement report.

At 635, the base station may transmit a handover command to the UE 115 including an indication of the cell selected for handover. At 640, the UE may perform a handover procedure to the indicated cell.

Figure 7:
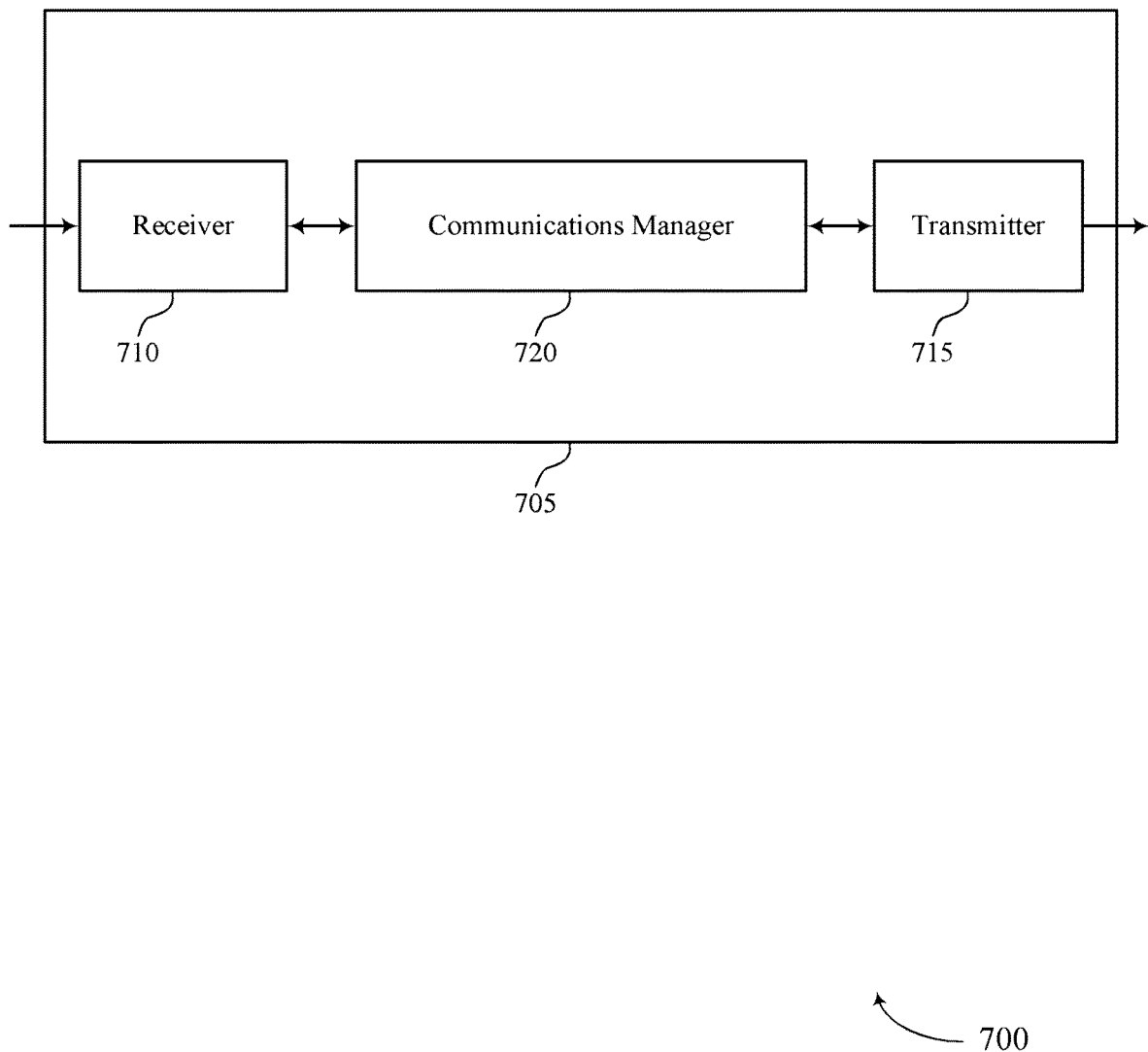
FIGS. 7 and 8 show block diagrams of devices that support techniques for biasing cell camping in high-speed UE deployment in accordance with various aspects of the present disclosure.

FIG. 7 shows a block diagram of a device that supports techniques for biasing cell camping in high-speed UE deployment in accordance with various aspects of the present disclosure. A device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to techniques for biasing cell camping in high-speed UE deployment). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to techniques for biasing cell camping in high-speed UE deployment). In some examples, the transmitter 715 may be co-located with a receiver 710 in a transceiver component. The transmitter 715 may utilize a single antenna or a set of multiple antennas.

The communications manager 720, the receiver 710, the transmitter 715, or various combinations thereof or various components thereof may be examples of means for performing various aspects of techniques for biasing cell camping in high-speed UE deployment as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 720 may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a UE in accordance with examples as disclosed herein. For example, the communications manager 720 may be configured as or otherwise support a means for determining that a first cell is associated with a first deployment mode of a set of multiple deployment modes based on at least one of a set of multiple conditions of the first cell being satisfied, the first deployment mode associated with serving one or more UEs travelling at a speed above a speed threshold. The communications manager 720 may be configured as or otherwise support a means for selecting, based on the determination, at least one of a frequency-based initial cell selection or a cell-based initial cell selection for the UE, where the selection is based at least in part on a frequency database or a cell database, or both. The communications manager 720 may be configured as or otherwise support a means for measuring one or more frequencies of one or more cells including the first cell to obtain a set of measured parameters, each cell of the one or more cells corresponding to a respective deployment mode of the set of multiple deployment modes and a respective measured parameter of the set of measured parameters. The communications manager 720 may be configured as or otherwise support a means for selecting a candidate cell from the one or more cells based on the respective measured parameters of each cell and the respective deployment modes of each cell. The communications manager 720 may be configured as or otherwise support a means for establishing, as part of the initial cell selection, a connection with the candidate cell based on selecting the candidate cell.

Additionally or alternatively, the communications manager 720 may support wireless communication at a UE in accordance with examples as disclosed herein. For example, the communications manager 720 may be configured as or otherwise support a means for determining that a first cell is associated with a first deployment mode of a set of multiple deployment modes based on one or more conditions being satisfied, the first deployment mode associated with a speed above a speed threshold. The communications manager 720 may be configured as or otherwise support a means for establishing a connection with the first cell based on determining that the first cell is associated with the first deployment mode. The communications manager 720 may be configured as or otherwise support a means for performing a set of measurements for one or more neighboring cells and the first cell to obtain a set of measured values, each of the one or more neighboring cells and the first cell corresponding to a respective measured value of the set of measured values. The communications manager 720 may be configured as or otherwise support a means for applying an offset to the respective measured value associated with the first cell based on the first cell being associated with the first deployment mode. The communications manager 720 may be configured as or otherwise support a means for determining whether to connect to one of the one or more neighboring cells based on the applied offset to the respective measured value associated with the first cell and respective measured values associated with the one or more neighboring cells.

By including or configuring the communications manager 720 in accordance with examples as described herein, the device 705 (e.g., a processor controlling or otherwise coupled to the receiver 710, the transmitter 715, the communications manager 720, or a combination thereof) may support techniques for realizing one or more potential advantages based on biased cell camping. One implementation may allow a UE 115 to save power and increase battery life by avoiding having to perform cell re-selection procedures when a power level of an HST cell satisfies a threshold, which may result in selection of a non-HST cell even though the UE 115 is in an HST mode or traveling above a speed threshold. Additionally or alternatively, the UE 115 may further reduce the extent in which it wakes up from idle periods to perform various cell selection, reselection or handover procedures. Another implementation may provide improved quality and reliability of service at the UE 115, as the UE 115 may be biased towards selecting an HST cell with multiple TRPs (e.g., repeaters) along an HST route.

Figure 8:
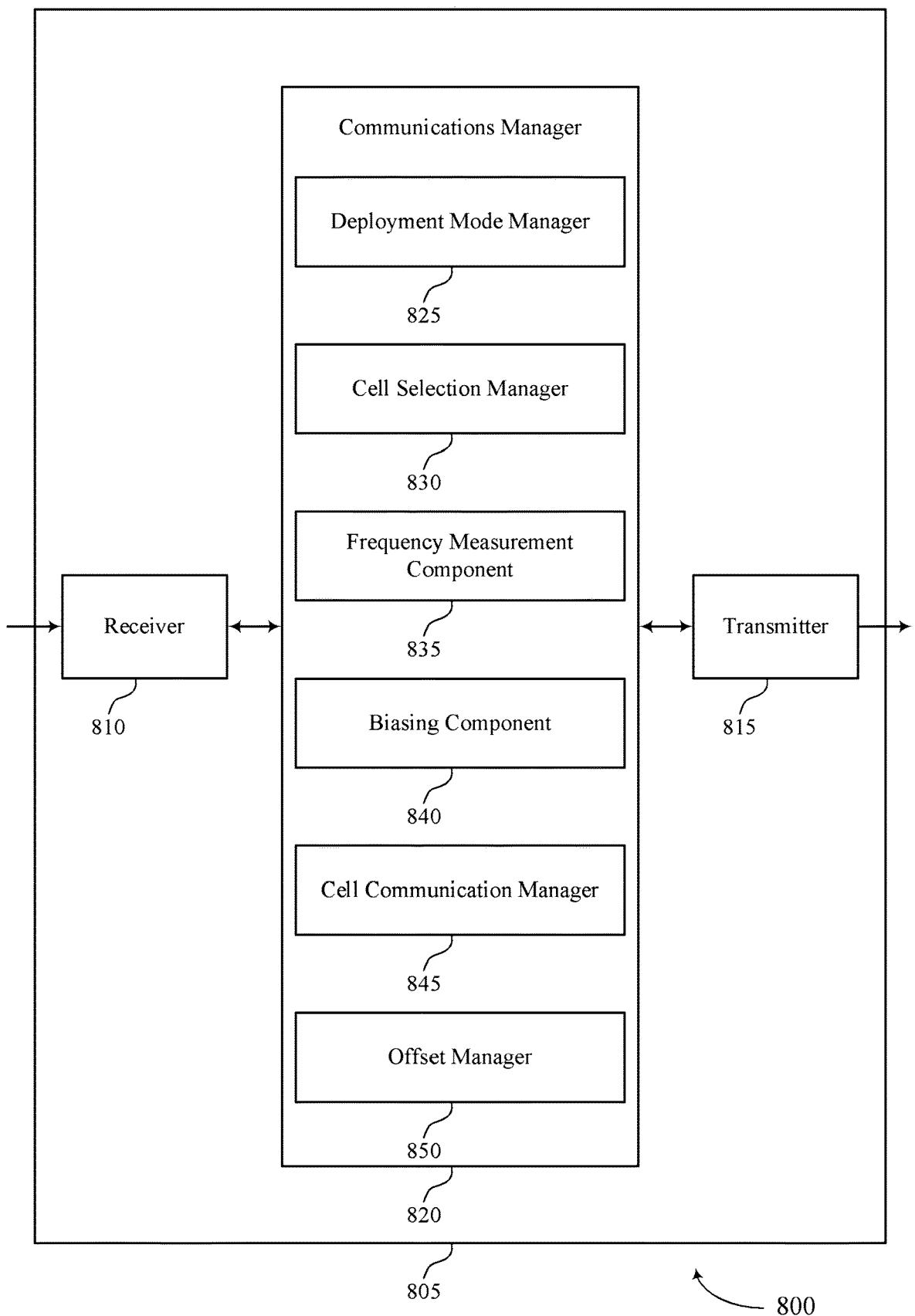

FIG. 8 shows a block diagram of a device that supports techniques for biasing cell camping in high-speed UE deployment in accordance with various aspects of the present disclosure. A device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to techniques for biasing cell camping in high-speed UE deployment). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to techniques for biasing cell camping in high-speed UE deployment). In some examples, the transmitter 815 may be co-located with a receiver 810 in a transceiver component. The transmitter 815 may utilize a single antenna or a set of multiple antennas.

The device 805, or various components thereof, may be an example of means for performing various aspects of techniques for biasing cell camping in high-speed UE deployment as described herein. For example, the communications manager 820 may include a deployment mode manager 825, a cell selection manager 830, a frequency measurement component 835, a biasing component 840, a cell communication manager 845, an offset manager 850, or any combination thereof. The communications manager 820 may be an example of aspects of a communications manager 720 as described herein. In some examples, the communications manager 820, or various components thereof, may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a UE in accordance with examples as disclosed herein. The deployment mode manager 825 may be configured as or otherwise support a means for determining that a first cell is associated with a first deployment mode of a set of multiple deployment modes based on at least one of a set of multiple conditions of the first cell being satisfied, the first deployment mode associated with serving one or more UEs travelling at a speed above a speed threshold. The cell selection manager 830 may be configured as or otherwise support a means for selecting, based on the determination, at least one of a frequency-based initial cell selection or a cell-based initial cell selection for the UE, where the selection is based at least in part on a frequency database or a cell database, or both. The frequency measurement component 835 may be configured as or otherwise support a means for measuring one or more frequencies of one or more cells including the first cell to obtain a set of measured parameters, each cell of the one or more cells corresponding to a respective deployment mode of the set of multiple deployment modes and a respective measured parameter of the set of measured parameters. The biasing component 840 may be configured as or otherwise support a means for selecting a candidate cell from the one or more cells based on the respective measured parameters of each cell and the respective deployment modes of each cell. The cell communication manager 845 may be configured as or otherwise support a means for establishing, as part of the initial cell selection, a connection with the candidate cell based on selecting the candidate cell.

Additionally or alternatively, the communications manager 820 may support wireless communication at a UE in accordance with examples as disclosed herein. The deployment mode manager 825 may be configured as or otherwise support a means for determining that a first cell is associated with a first deployment mode of a set of multiple deployment modes based on one or more conditions being satisfied, the first deployment mode associated with a speed above a speed threshold. The cell communication manager 845 may be configured as or otherwise support a means for establishing a connection with the first cell based on determining that the first cell is associated with the first deployment mode. The frequency measurement component 835 may be configured as or otherwise support a means for performing a set of measurements for one or more neighboring cells and the first cell to obtain a set of measured values, each of the one or more neighboring cells and the first cell corresponding to a respective measured value of the set of measured values. The offset manager 850 may be configured as or otherwise support a means for applying an offset to the respective measured value associated with the first cell based on the first cell being associated with the first deployment mode. The cell communication manager 845 may be configured as or otherwise support a means for determining whether to connect to one of the one or more neighboring cells based on the applied offset to the respective measured value associated with the first cell and respective measured values associated with the one or more neighboring cells.

Figure 9:
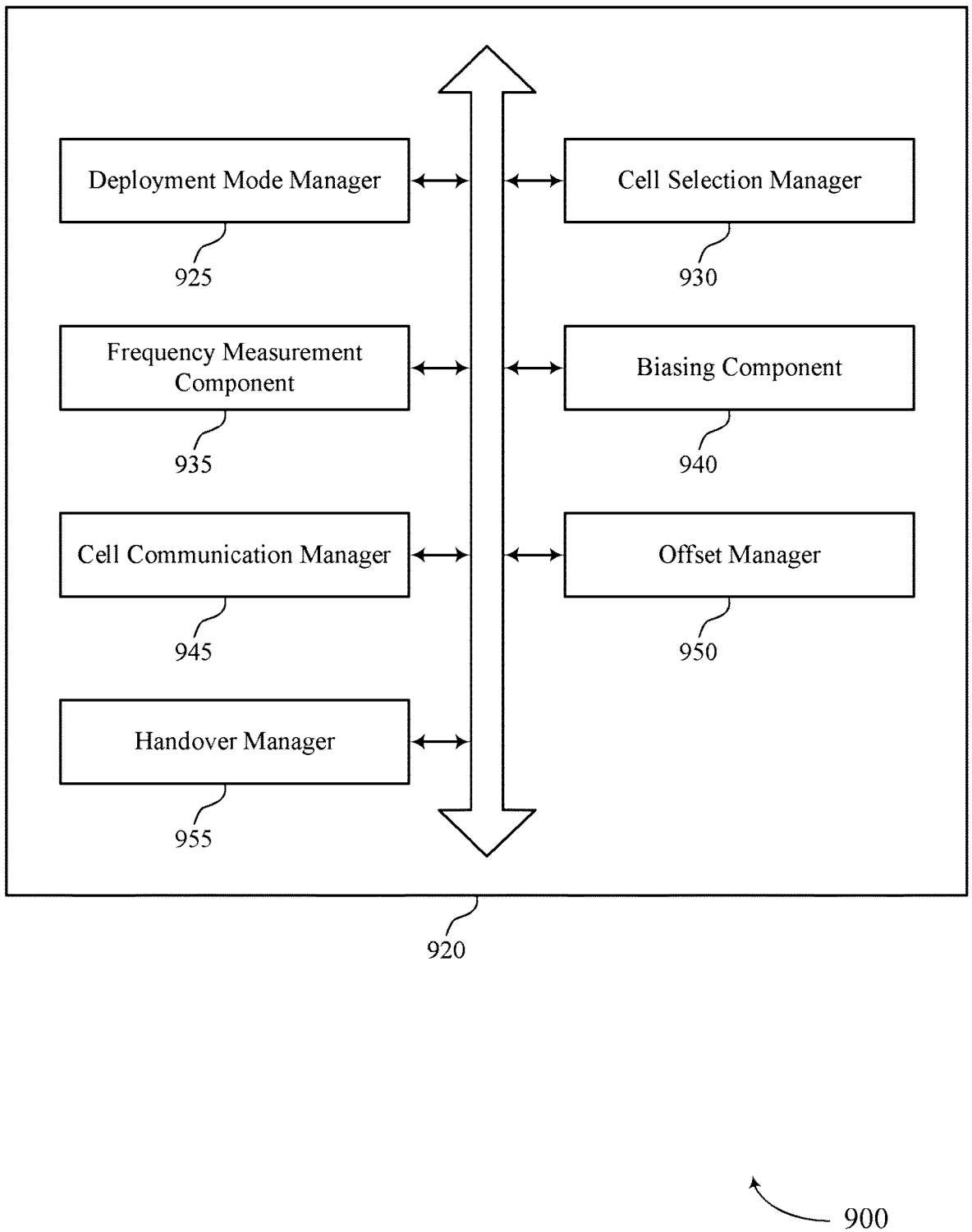
FIG. 9 shows a block diagram of a communications manager that supports techniques for biasing cell camping in high-speed UE deployment in accordance with various aspects of the present disclosure.

FIG. 9 shows a block diagram of a communications manager that supports techniques for biasing cell camping in high-speed UE deployment in accordance with various aspects of the present disclosure. A communications manager 920 may be an example of aspects of a communications manager 720, a communications manager 820, or both, as described herein. The communications manager 920, or various components thereof, may be an example of means for performing various aspects of techniques for biasing cell camping in high-speed UE deployment as described herein. For example, the communications manager 920 may include a deployment mode manager 925, a cell selection manager 930, a frequency measurement component 935, a biasing component 940, a cell communication manager 945, an offset manager 950, a handover manager 955, or any combination thereof. Each of these components may communicate, directly or indirectly, with one another (e.g., via one or more buses).

The communications manager 920 may support wireless communication at a UE in accordance with examples as disclosed herein. The deployment mode manager 925 may be configured as or otherwise support a means for determining that a first cell is associated with a first deployment mode of a set of multiple deployment modes based on at least one of a set of multiple conditions of the first cell being satisfied, the first deployment mode associated with serving one or more UEs travelling at a speed above a speed threshold. The cell selection manager 930 may be configured as or otherwise support a means for selecting, based on the determination, at least one of a frequency-based initial cell selection or a cell-based initial cell selection for the UE, where the selection is based at least in part on a frequency database or a cell database, or both. The frequency measurement component 935 may be configured as or otherwise support a means for measuring one or more frequencies of one or more cells including the first cell to obtain a set of measured parameters, each cell of the one or more cells corresponding to a respective deployment mode of the set of multiple deployment modes and a respective measured parameter of the set of measured parameters. The biasing component 940 may be configured as or otherwise support a means for selecting a candidate cell from the one or more cells based on the respective measured parameters of each cell and the respective deployment modes of each cell. The cell communication manager 945 may be configured as or otherwise support a means for establishing, as part of the initial cell selection, a connection with the candidate cell based on selecting the candidate cell.

In some examples, the deployment mode manager 925 may be configured as or otherwise support a means for receiving, from the first cell, an indication of the first deployment mode. In some examples, the deployment mode manager 925 may be configured as or otherwise support a means for determining that the at least one condition is satisfied based on receiving the indication of the first deployment mode. In some examples, the cell selection manager 930 may be configured as or otherwise support a means for selecting the cell-based initial cell selection based on the at least one condition being associated with the frequency database and the cell database. In some examples, the frequency measurement component 935 may be configured as or otherwise support a means for determining a set of power levels associated with the one or more cells based on the cell-based initial cell selection, the set of measured parameters including the set of power levels, where the candidate cell is selected based on the set of power levels.

In some examples, to support selecting the candidate cell, the biasing component 940 may be configured as or otherwise support a means for selecting the candidate cell associated with a highest power level of the set of power levels and associated with the first deployment mode.

In some examples, the frequency measurement component 935 may be configured as or otherwise support a means for determining that at least one power level of the set of power levels satisfies a first threshold. In some examples, the frequency measurement component 935 may be configured as or otherwise support a means for determining a subset of the one or more cells based on the at least one power level of the set of power levels satisfying the first threshold, where a respective power level associated with each of the subset of the one or more cells satisfies a second threshold. In some examples, the biasing component 940 may be configured as or otherwise support a means for selecting the candidate cell from the subset, where the candidate cell is associated with the first deployment mode.

In some examples, the frequency measurement component 935 may be configured as or otherwise support a means for determining that at least one power level of the set of power levels satisfies a first threshold. In some examples, the frequency measurement component 935 may be configured as or otherwise support a means for determining a first subset of the one or more cells based on the at least one power level of the set of power levels satisfying the first threshold, where a respective power level associated with each of the first subset of the one or more cells satisfies a second threshold. In some examples, the cell selection manager 930 may be configured as or otherwise support a means for determining that each cell of the first subset is absent from the cell database. In some examples, the biasing component 940 may be configured as or otherwise support a means for selecting the candidate cell from a second subset of the one or more cells, the second subset different from the first subset.

In some examples, the frequency measurement component 935 may be configured as or otherwise support a means for determining that each power level of the set of power levels is below a first threshold, where the candidate cell is selected based on determining that each power level of the set of power levels is below the first threshold, the candidate cell associated with a highest power level of the set of power levels.

In some examples, the cell selection manager 930 may be configured as or otherwise support a means for searching a database of cell frequencies corresponding to the first deployment mode before searching other cell frequencies, where searching the database of cell frequencies includes temporally prioritizing entries of the database of cell frequencies.

In some examples, the cell selection manager 930 may be configured as or otherwise support a means for selecting the frequency-based initial cell selection based on the at least one condition being associated with the frequency database. In some examples, the frequency measurement component 935 may be configured as or otherwise support a means for determining a set of power levels associated with a subset of the one or more cells based on the frequency-based initial cell selection, the set of measured parameters including the set of power levels, where each cell of the subset corresponds to the first deployment mode. In some examples, the biasing component 940 may be configured as or otherwise support a means for selecting the candidate cell from the subset based on the set of power levels.

In some examples, the cell selection manager 930 may be configured as or otherwise support a means for selecting the frequency-based initial cell selection based on the at least one condition being associated with the frequency database. In some examples, the frequency measurement component 935 may be configured as or otherwise support a means for determining a set of power levels associated with a first subset of the one or more cells based on the frequency-based initial cell selection, the set of measured parameters including the set of power levels, where each cell of the first subset corresponds to the first deployment mode. In some examples, the biasing component 940 may be configured as or otherwise support a means for selecting the candidate cell from a second subset of the one or more cells based on the set of power levels, the second subset exclusive of the first subset.

In some examples, the deployment mode manager 925 may be configured as or otherwise support a means for determining the UE is associated with a first radio access technology. In some examples, the biasing component 940 may be configured as or otherwise support a means for scanning frequencies associated with the first radio access technology, where measuring the one or more frequencies associated with the one or more cells is based on scanning the frequencies associated with the first radio access technology.

In some examples, the deployment mode manager 925 may be configured as or otherwise support a means for determining whether an indication associated with the one or more cells is set to true. In some examples, the cell selection manager 930 may be configured as or otherwise support a means for adding the measured one or more frequencies to a database based on the associated indication being set to true.

In some examples, to support at least one condition, the deployment mode manager 925 may be configured as or otherwise support a means for receiving system information that indicates the first deployment mode from the first cell, where the first cell is associated with a second radio access technology.

In some examples, the system information includes a random access channel preamble configuration indicative of the first deployment mode.

In some examples, the system information includes a system information block that includes a deployment mode flag indicative of the first deployment mode.

In some examples, to support at least one condition, the deployment mode manager 925 may be configured as or otherwise support a means for receiving system information that indicates the first deployment mode from the first cell.

In some examples, the cell selection manager 930 may be configured as or otherwise support a means for adding a measured frequency corresponding to the first cell to a database, where the database is valid for a period of time. In some examples, the biasing component 940 may be configured as or otherwise support a means for determining that at least one cell of the one or more cells is a potential candidate cell based on the measured frequency being present in the database. In some examples, the cell selection manager 930 may be configured as or otherwise support a means for adding an identifier of the potential candidate cell to a second database.

In some examples, to support at least one condition, the deployment mode manager 925 may be configured as or otherwise support a means for detecting, by at least one subscriber identity module card of the UE, that the at least one condition is satisfied, where the set of multiple conditions includes a random access channel preamble configuration associated with the first deployment mode, a system information block 1 (SIB-1) including a first deployment mode flag, a system information block 2 (SIB-2) including the first deployment mode flag, or a frequency tracking loop (FTL) jump at the UE, or any combination thereof.

In some examples, to support determining that the first cell is associated with the first deployment mode, the deployment mode manager 925 may be configured as or otherwise support a means for determining a country code associated with the first cell, a public land mobile network associated with the cell, or both.

In some examples, to support determining that the first cell is associated with the first deployment mode, the deployment mode manager 925 may be configured as or otherwise support a means for determining that a velocity associated with the UE exceeds a threshold based on one or more sensors of the UE.

In some examples, to support determining that the first cell is associated with the first deployment mode, the deployment mode manager 925 may be configured as or otherwise support a means for obtaining information from one or more other UEs indicating that the first cell is associated with the first deployment mode based on a cell global identifier of the first cell.

In some examples, the UE selects from one of the frequency-based initial cell selection or the cell-based initial cell selection based on connecting to a network based on the UE powering up, connecting to a network based on the UE being in a reduced capability mode, connecting to a network based on the UE being out of service, connecting to a network based on the UE experiencing a radio link failure, or connecting to a network based on the UE performing a fast return procedure.

Additionally or alternatively, the communications manager 920 may support wireless communication at a UE in accordance with examples as disclosed herein. In some examples, the deployment mode manager 925 may be configured as or otherwise support a means for determining that a first cell is associated with a first deployment mode of a set of multiple deployment modes based on one or more conditions being satisfied, the first deployment mode associated with a speed above a speed threshold. In some examples, the cell communication manager 945 may be configured as or otherwise support a means for establishing a connection with the first cell based on determining that the first cell is associated with the first deployment mode. In some examples, the frequency measurement component 935 may be configured as or otherwise support a means for performing a set of measurements for one or more neighboring cells and the first cell to obtain a set of measured values, each of the one or more neighboring cells and the first cell corresponding to a respective measured value of the set of measured values. The offset manager 950 may be configured as or otherwise support a means for applying an offset to the respective measured value associated with the first cell based on the first cell being associated with the first deployment mode. In some examples, the cell communication manager 945 may be configured as or otherwise support a means for determining whether to connect to one of the one or more neighboring cells based on the applied offset to the respective measured value associated with the first cell and respective measured values associated with the one or more neighboring cells.

In some examples, the offset manager 950 may be configured as or otherwise support a means for applying the offset to one or more other cells, where each of the one or more other cells is associated with the first deployment mode.

In some examples, the first cell is associated with a first radio access technology and the one or more neighboring cells is associated with the first radio access technology or a second radio access technology, and the offset manager 950 may be configured as or otherwise support a means for applying the offset to a subset of the one or more neighboring cells associated with the first deployment mode. In some examples, the first cell is associated with a first radio access technology and the one or more neighboring cells is associated with the first radio access technology or a second radio access technology, and the frequency measurement component 935 may be configured as or otherwise support a means for transmitting, to a base station, a measurement report including the set of measured values including an offset value corresponding to the offset applied to the respective measured value associated with the first cell and offset values corresponding to the offset applied to the one or more neighboring cells associated with the first deployment mode.

In some examples, the frequency measurement component 935 may be configured as or otherwise support a means for transmitting, to a base station, a measurement report including the set of measured values including an offset value corresponding to the offset applied to the respective measured value associated with the first cell.

In some examples, the cell communication manager 945 may be configured as or otherwise support a means for receiving, from the base station, a handover command indicating that the UE is to handover to one of the one or more neighboring cells based on the measurement report. In some examples, the handover manager 955 may be configured as or otherwise support a means for performing cell handover based on receiving the handover command.

In some examples, the UE is in an RRC connected mode, an RRC idle mode, or an RRC inactive mode.

In some examples, the UE is in an RRC idle mode or an RRC inactive mode.

In some examples, to support one or more conditions, the deployment mode manager 925 may be configured as or otherwise support a means for receiving system information that indicates the first deployment mode from the first cell, where the first cell is associated with a second radio access technology.

Figure 10:
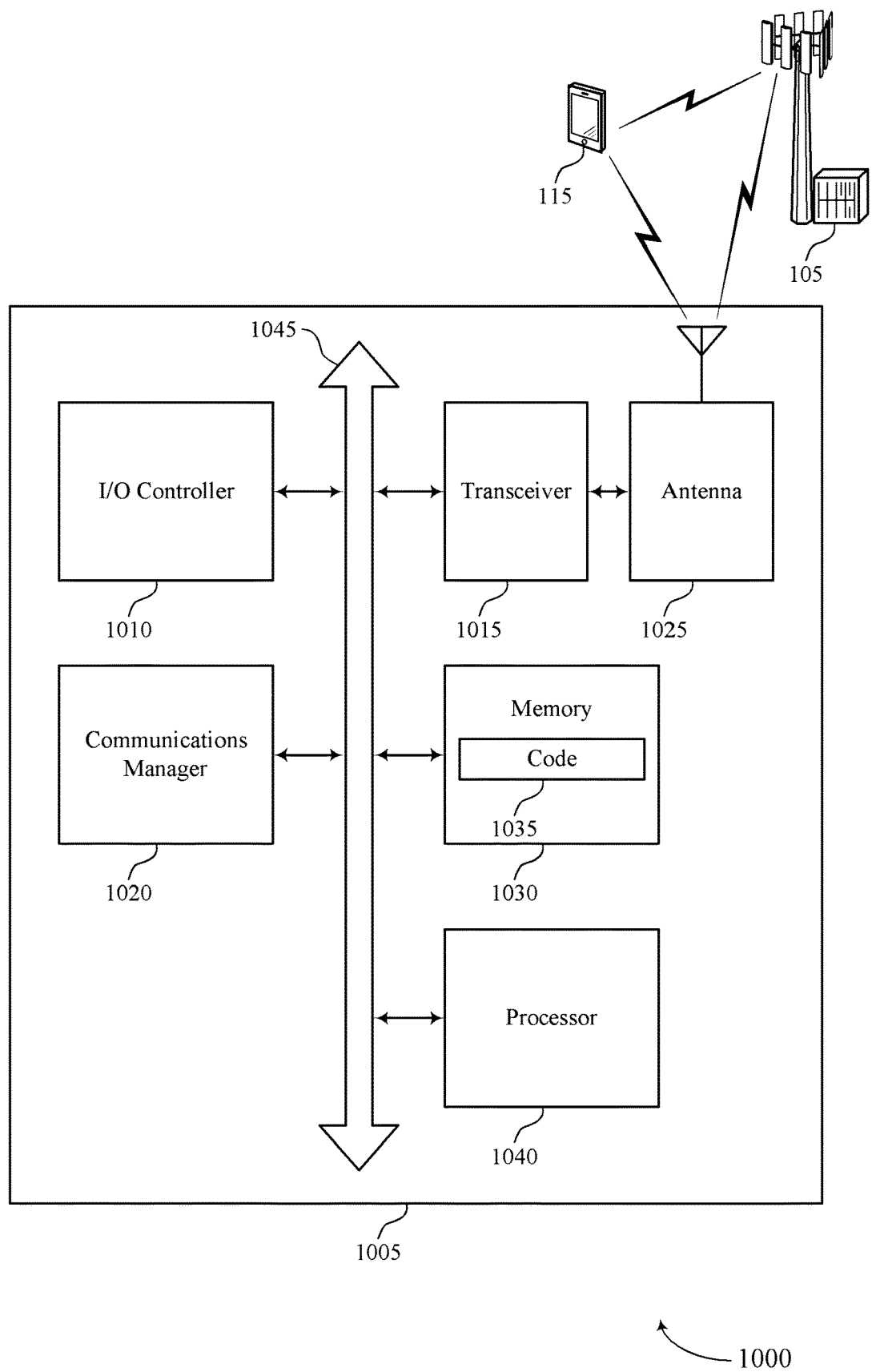
FIG. 10 shows a diagram of a system including a device that supports techniques for biasing cell camping in high-speed UE deployment in accordance with various aspects of the present disclosure.

FIG. 10 shows a diagram of a system including a device that supports techniques for biasing cell camping in high-speed UE deployment in accordance with various aspects of the present disclosure. A device 1005 may be an example of or include the components of a device 705, a device 805, or a UE 115 as described herein. The device 1005 may communicate wirelessly with one or more base stations 105, UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting techniques for biasing cell camping in high-speed UE deployment). For example, the device 1005 or a component of the device 1005 may include a processor 1040 and memory 1030 coupled to the processor 1040, the processor 1040 and memory 1030 configured to perform various functions described herein.

The communications manager 1020 may support wireless communication at a UE in accordance with examples as disclosed herein. For example, the communications manager 1020 may be configured as or otherwise support a means for determining that a first cell is associated with a first deployment mode of a set of multiple deployment modes based on at least one of a set of multiple conditions of the first cell being satisfied, the first deployment mode associated with serving one or more UEs travelling at a speed above a speed threshold. The communications manager 1020 may be configured as or otherwise support a means for selecting, based on the determination, at least one of a frequency-based initial cell selection or a cell-based initial cell selection for the UE, where the selection is based at least in part on a frequency database or a cell database, or both. The communications manager 1020 may be configured as or otherwise support a means for measuring one or more frequencies of one or more cells including the first cell to obtain a set of measured parameters, each cell of the one or more cells corresponding to a respective deployment mode of the set of multiple deployment modes and a respective measured parameter of the set of measured parameters. The communications manager 1020 may be configured as or otherwise support a means for selecting a candidate cell from the one or more cells based on the respective measured parameters of each cell and the respective deployment modes of each cell. The communications manager 1020 may be configured as or otherwise support a means for establishing, as part of the initial cell selection, a connection with the candidate cell based on selecting the candidate cell.

Additionally or alternatively, the communications manager 1020 may support wireless communication at a UE in accordance with examples as disclosed herein. For example, the communications manager 1020 may be configured as or otherwise support a means for determining that a first cell is associated with a first deployment mode of a set of multiple deployment modes based on one or more conditions being satisfied, the first deployment mode associated with a speed above a speed threshold. The communications manager 1020 may be configured as or otherwise support a means for establishing a connection with the first cell based on determining that the first cell is associated with the first deployment mode. The communications manager 1020 may be configured as or otherwise support a means for performing a set of measurements for one or more neighboring cells and the first cell to obtain a set of measured values, each of the one or more neighboring cells and the first cell corresponding to a respective measured value of the set of measured values. The communications manager 1020 may be configured as or otherwise support a means for applying an offset to the respective measured value associated with the first cell based on the first cell being associated with the first deployment mode. The communications manager 1020 may be configured as or otherwise support a means for determining whether to connect to one of the one or more neighboring cells based on the applied offset to the respective measured value associated with the first cell and respective measured values associated with the one or more neighboring cells.

By including or configuring the communications manager 1020 in accordance with examples as described herein, the device 1005 may support techniques for realizing one or more potential advantages based on biased cell camping. Based on measuring the one or more frequencies of one or more cells including the first cell to obtain the set of measured parameters, a processor of a UE 115 (e.g., controlling the receiver 710, the transmitter 715, (as described with reference to FIG. 9) or the transceiver 1015 may efficiently select a candidate cell from the one or more cells based on the respective measured parameters of each cell and the respective deployment modes of each cell. As such, when the connection with the candidate cell is established, the processor may be ready to respond more efficiently through the reduction of a ramp up in processing power.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of techniques for biasing cell camping in high-speed UE deployment as described herein, or the processor 1040 and the memory 1030 may be otherwise configured to perform or support such operations.

Figure 11:
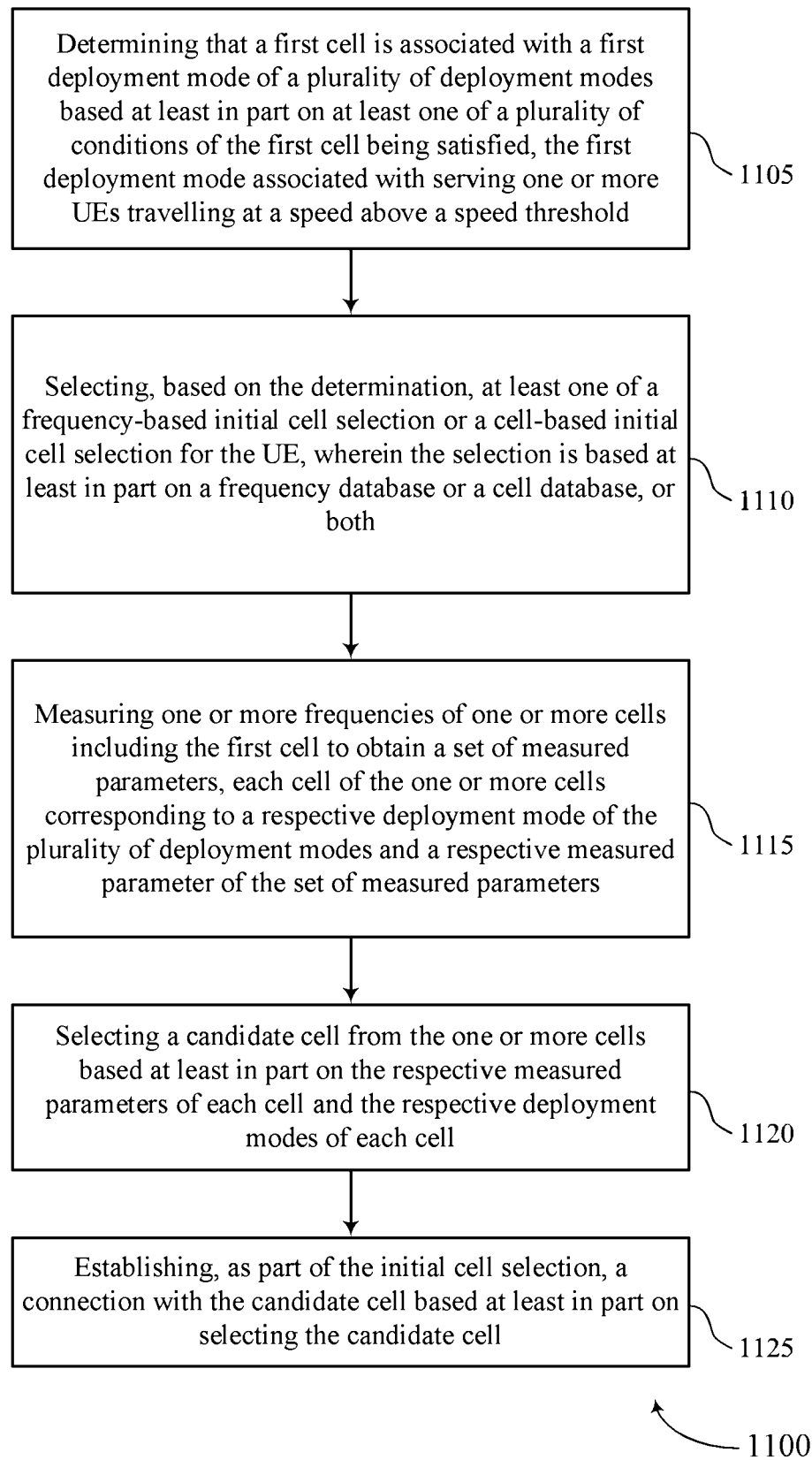
FIGS. 11 through 15 show flowcharts illustrating methods that support techniques for biasing cell camping in high-speed UE deployment in accordance with various aspects of the present disclosure.

FIG. 11 shows a flowchart illustrating a method that supports techniques for biasing cell camping in high-speed UE deployment in accordance with various aspects of the present disclosure. The operations of the method 1100 may be implemented by a UE or its components as described herein. For example, the operations of the method 1100 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1105, the method may include determining that a first cell is associated with a first deployment mode of a set of multiple deployment modes based on at least one of a set of multiple conditions of the first cell being satisfied, the first deployment mode associated with serving one or more UEs travelling at a speed above a speed threshold. The operations of 1105 may be performed in accordance with examples as disclosed herein. In some examples, aspects of the operations of 1105 may be performed by a deployment mode manager 925 as described with reference to FIG. 9.

At 1110, the method may include selecting, based on the determination, at least one of a frequency-based initial cell selection or a cell-based initial cell selection for the UE, where the selection is based at least in part on a frequency database or a cell database, or both. The operations of 1110 may be performed in accordance with examples as disclosed herein. In some examples, aspects of the operations of 1110 may be performed by a cell selection manager 930 as described with reference to FIG. 9.

At 1115, the method may include measuring one or more frequencies of one or more cells including the first cell to obtain a set of measured parameters, each cell of the one or more cells corresponding to a respective deployment mode of the set of multiple deployment modes and a respective measured parameter of the set of measured parameters. The operations of 1115 may be performed in accordance with examples as disclosed herein. In some examples, aspects of the operations of 1115 may be performed by a frequency measurement component 935 as described with reference to FIG. 9.

At 1120, the method may include selecting a candidate cell from the one or more cells based on the respective measured parameters of each cell and the respective deployment modes of each cell. The operations of 1120 may be performed in accordance with examples as disclosed herein. In some examples, aspects of the operations of 1120 may be performed by a biasing component 940 as described with reference to FIG. 9.

At 1125, the method may include establishing, as part of the initial cell selection, a connection with the candidate cell based on selecting the candidate cell. The operations of 1125 may be performed in accordance with examples as disclosed herein. In some examples, aspects of the operations of 1125 may be performed by a cell communication manager 945 as described with reference to FIG. 9.

Figure 12:
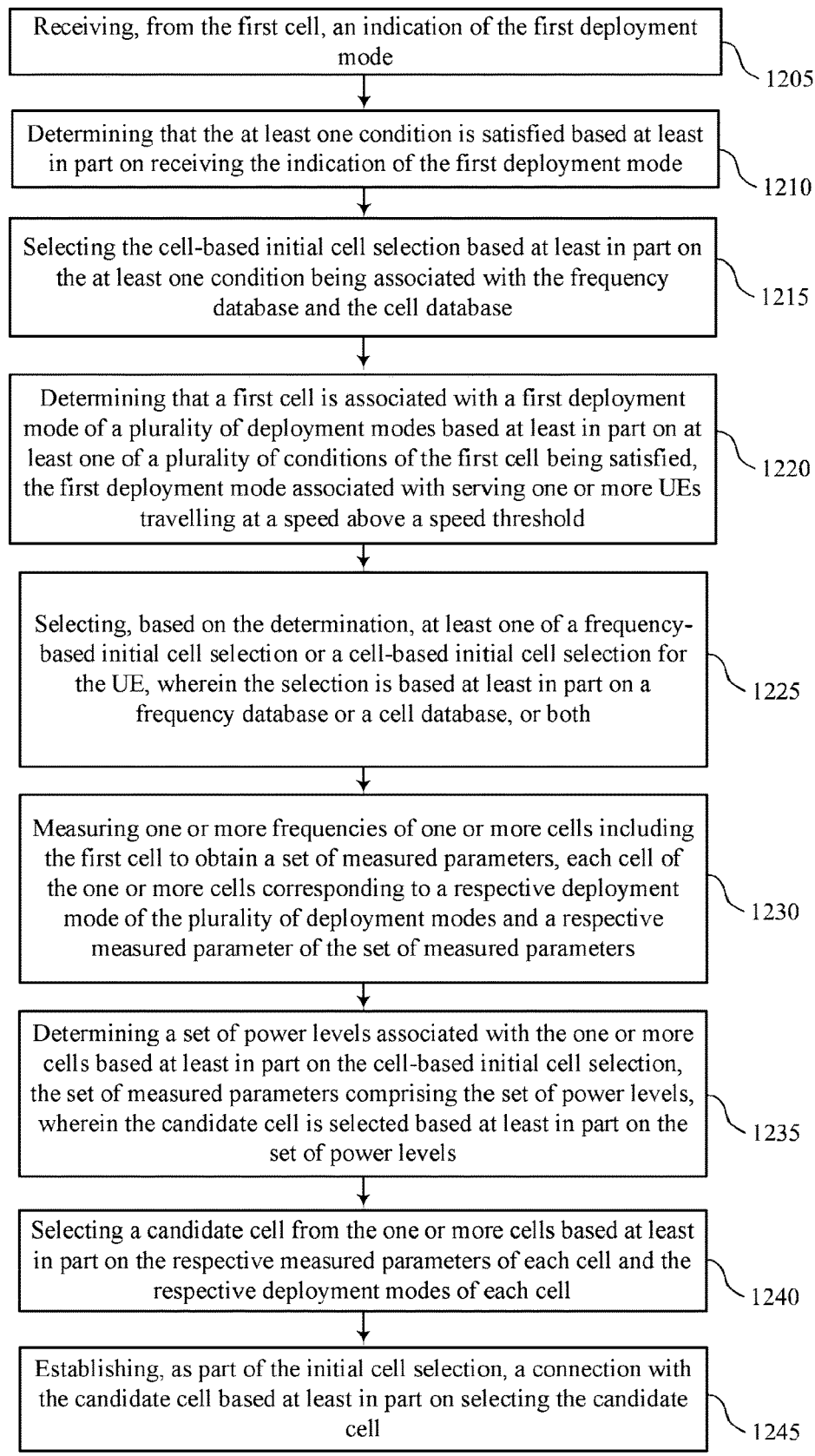

FIG. 12 shows a flowchart illustrating a method that supports techniques for biasing cell camping in high-speed UE deployment in accordance with various aspects of the present disclosure. The operations of the method 1200 may be implemented by a UE or its components as described herein. For example, the operations of the method 1200 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1205, the method may include receiving, from the first cell, an indication of the first deployment mode. The operations of 1205 may be performed in accordance with examples as disclosed herein. In some examples, aspects of the operations of 1205 may be performed by a deployment mode manager 925 as described with reference to FIG. 9.

At 1210, the method may include determining that the at least one condition is satisfied based on receiving the indication of the first deployment mode. The operations of 1210 may be performed in accordance with examples as disclosed herein. In some examples, aspects of the operations of 1210 may be performed by a deployment mode manager 925 as described with reference to FIG. 9.

At 1215, the method may include selecting the cell-based initial cell selection based on the at least one condition being associated with the frequency database and the cell database. The operations of 1215 may be performed in accordance with examples as disclosed herein. In some examples, aspects of the operations of 1215 may be performed by a cell selection manager 930 as described with reference to FIG. 9.

At 1220, the method may include determining that a first cell is associated with a first deployment mode of a set of multiple deployment modes based on at least one of a set of multiple conditions of the first cell being satisfied, the first deployment mode associated with serving one or more UEs travelling at a speed above a speed threshold. The operations of 1220 may be performed in accordance with examples as disclosed herein. In some examples, aspects of the operations of 1220 may be performed by a deployment mode manager 925 as described with reference to FIG. 9.

At 1225, the method may include selecting, based on the determination, at least one of a frequency-based initial cell selection or a cell-based initial cell selection for the UE, where the selection is based at least in part on a frequency database or a cell database, or both. The operations of 1225 may be performed in accordance with examples as disclosed herein. In some examples, aspects of the operations of 1225 may be performed by a cell selection manager 930 as described with reference to FIG. 9.

At 1230, the method may include measuring one or more frequencies of one or more cells including the first cell to obtain a set of measured parameters, each cell of the one or more cells corresponding to a respective deployment mode of the set of multiple deployment modes and a respective measured parameter of the set of measured parameters. The operations of 1230 may be performed in accordance with examples as disclosed herein. In some examples, aspects of the operations of 1230 may be performed by a frequency measurement component 935 as described with reference to FIG. 9.

At 1235, the method may include determining a set of power levels associated with the one or more cells based on the cell-based initial cell selection, the set of measured parameters including the set of power levels, where the candidate cell is selected based on the set of power levels. The operations of 1235 may be performed in accordance with examples as disclosed herein. In some examples, aspects of the operations of 1235 may be performed by a frequency measurement component 935 as described with reference to FIG. 9.

At 1240, the method may include selecting a candidate cell from the one or more cells based on the respective measured parameters of each cell and the respective deployment modes of each cell. The operations of 1240 may be performed in accordance with examples as disclosed herein. In some examples, aspects of the operations of 1240 may be performed by a biasing component 940 as described with reference to FIG. 9.

At 1245, the method may include establishing, as part of the initial cell selection, a connection with the candidate cell based on selecting the candidate cell. The operations of 1245 may be performed in accordance with examples as disclosed herein. In some examples, aspects of the operations of 1245 may be performed by a cell communication manager 945 as described with reference to FIG. 9.

Figure 13:
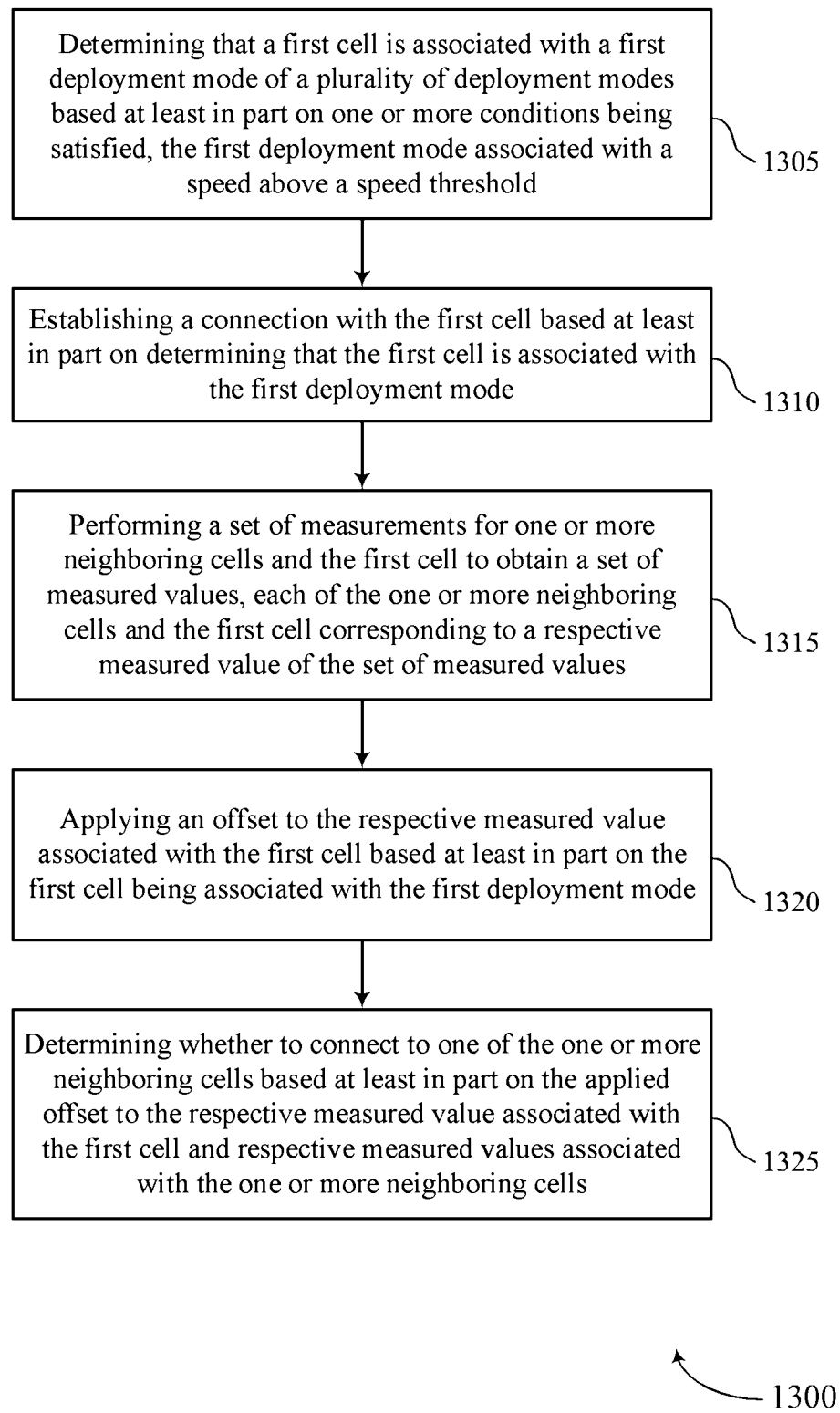

FIG. 13 shows a flowchart illustrating a method that supports techniques for biasing cell camping in high-speed UE deployment in accordance with various aspects of the present disclosure. The operations of the method 1300 may be implemented by a UE or its components as described herein. For example, the operations of the method 1300 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1305, the method may include determining that a first cell is associated with a first deployment mode of a set of multiple deployment modes based on one or more conditions being satisfied, the first deployment mode associated with a speed above a speed threshold. The operations of 1305 may be performed in accordance with examples as disclosed herein. In some examples, aspects of the operations of 1305 may be performed by a deployment mode manager 925 as described with reference to FIG. 9.

At 1310, the method may include establishing a connection with the first cell based on determining that the first cell is associated with the first deployment mode. The operations of 1310 may be performed in accordance with examples as disclosed herein. In some examples, aspects of the operations of 1310 may be performed by a cell communication manager 945 as described with reference to FIG. 9.

At 1315, the method may include performing a set of measurements for one or more neighboring cells and the first cell to obtain a set of measured values, each of the one or more neighboring cells and the first cell corresponding to a respective measured value of the set of measured values. The operations of 1315 may be performed in accordance with examples as disclosed herein. In some examples, aspects of the operations of 1315 may be performed by a frequency measurement component 935 as described with reference to FIG. 9.

At 1320, the method may include applying an offset to the respective measured value associated with the first cell based on the first cell being associated with the first deployment mode. The operations of 1320 may be performed in accordance with examples as disclosed herein. In some examples, aspects of the operations of 1320 may be performed by an offset manager 950 as described with reference to FIG. 9.

At 1325, the method may include determining whether to connect to one of the one or more neighboring cells based on the applied offset to the respective measured value associated with the first cell and respective measured values associated with the one or more neighboring cells. The operations of 1325 may be performed in accordance with examples as disclosed herein. In some examples, aspects of the operations of 1325 may be performed by a cell communication manager 945 as described with reference to FIG. 9.

Figure 14:
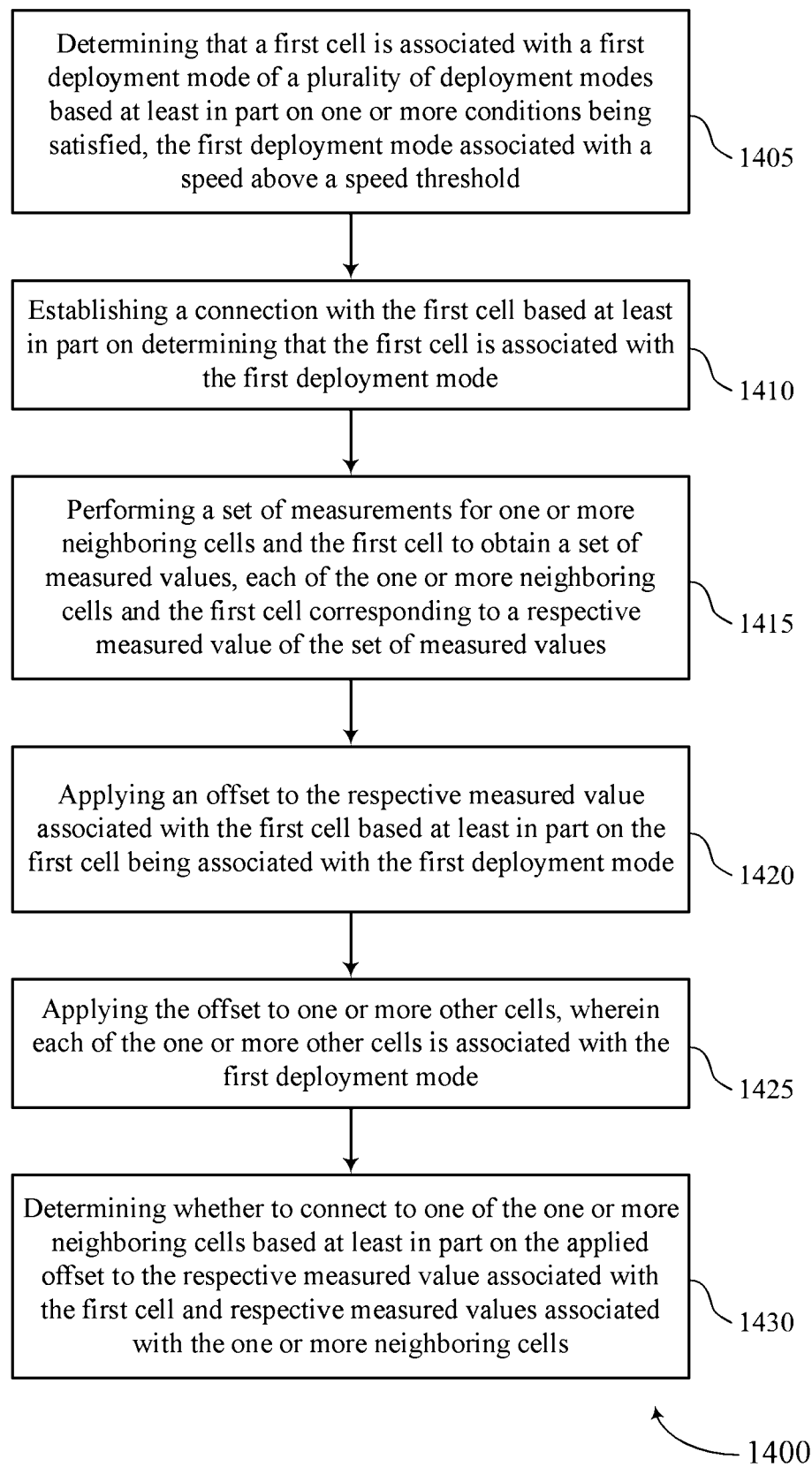

FIG. 14 shows a flowchart illustrating a method that supports techniques for biasing cell camping in high-speed UE deployment in accordance with various aspects of the present disclosure. The operations of the method 1400 may be implemented by a UE or its components as described herein. For example, the operations of the method 1400 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1405, the method may include determining that a first cell is associated with a first deployment mode of a set of multiple deployment modes based on one or more conditions being satisfied, the first deployment mode associated with a speed above a speed threshold. The operations of 1405 may be performed in accordance with examples as disclosed herein. In some examples, aspects of the operations of 1405 may be performed by a deployment mode manager 925 as described with reference to FIG. 9.

At 1410, the method may include establishing a connection with the first cell based on determining that the first cell is associated with the first deployment mode. The operations of 1410 may be performed in accordance with examples as disclosed herein. In some examples, aspects of the operations of 1410 may be performed by a cell communication manager 945 as described with reference to FIG. 9.

At 1415, the method may include performing a set of measurements for one or more neighboring cells and the first cell to obtain a set of measured values, each of the one or more neighboring cells and the first cell corresponding to a respective measured value of the set of measured values. The operations of 1415 may be performed in accordance with examples as disclosed herein. In some examples, aspects of the operations of 1415 may be performed by a frequency measurement component 935 as described with reference to FIG. 9.

At 1420, the method may include applying an offset to the respective measured value associated with the first cell based on the first cell being associated with the first deployment mode. The operations of 1420 may be performed in accordance with examples as disclosed herein. In some examples, aspects of the operations of 1420 may be performed by an offset manager 950 as described with reference to FIG. 9.

At 1425, the method may include applying the offset to one or more other cells, where each of the one or more other cells is associated with the first deployment mode. The operations of 1425 may be performed in accordance with examples as disclosed herein. In some examples, aspects of the operations of 1425 may be performed by an offset manager 950 as described with reference to FIG. 9.

At 1430, the method may include determining whether to connect to one of the one or more neighboring cells based on the applied offset to the respective measured value associated with the first cell and respective measured values associated with the one or more neighboring cells. The operations of 1430 may be performed in accordance with examples as disclosed herein. In some examples, aspects of the operations of 1430 may be performed by a cell communication manager 945 as described with reference to FIG. 9.

Figure 15:
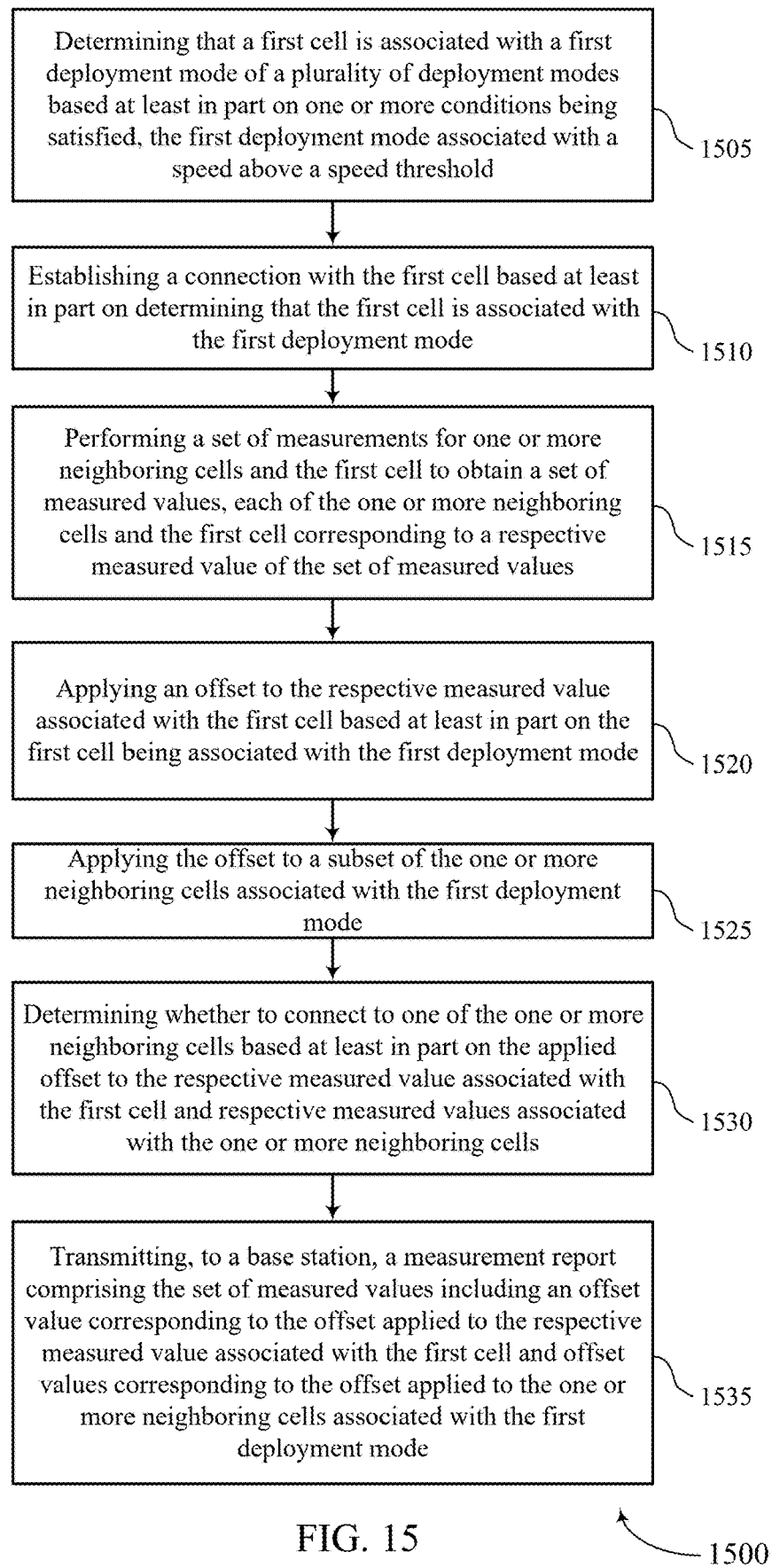

FIG. 15 shows a flowchart illustrating a method that supports techniques for biasing cell camping in high-speed UE deployment in accordance with various aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1505, the method may include determining that a first cell is associated with a first deployment mode of a set of multiple deployment modes based on one or more conditions being satisfied, the first deployment mode associated with a speed above a speed threshold. The operations of 1505 may be performed in accordance with examples as disclosed herein. In some examples, aspects of the operations of 1505 may be performed by a deployment mode manager 925 as described with reference to FIG. 9.

At 1510, the method may include establishing a connection with the first cell based on determining that the first cell is associated with the first deployment mode. The operations of 1510 may be performed in accordance with examples as disclosed herein. In some examples, aspects of the operations of 1510 may be performed by a cell communication manager 945 as described with reference to FIG. 9.

At 1515, the method may include performing a set of measurements for one or more neighboring cells and the first cell to obtain a set of measured values, each of the one or more neighboring cells and the first cell corresponding to a respective measured value of the set of measured values. The operations of 1515 may be performed in accordance with examples as disclosed herein. In some examples, aspects of the operations of 1515 may be performed by a frequency measurement component 935 as described with reference to FIG. 9.

At 1520, the method may include applying an offset to the respective measured value associated with the first cell based on the first cell being associated with the first deployment mode. The operations of 1520 may be performed in accordance with examples as disclosed herein. In some examples, aspects of the operations of 1520 may be performed by an offset manager 950 as described with reference to FIG. 9.

At 1525, the method may include applying the offset to a subset of the one or more neighboring cells associated with the first deployment mode. The operations of 1525 may be performed in accordance with examples as disclosed herein.

In some examples, aspects of the operations of 1525 may be performed by an offset manager 950 as described with reference to FIG. 9.

At 1530, the method may include determining whether to connect to one of the one or more neighboring cells based on the applied offset to the respective measured value associated with the first cell and respective measured values associated with the one or more neighboring cells. The operations of 1530 may be performed in accordance with examples as disclosed herein. In some examples, aspects of the operations of 1530 may be performed by a cell communication manager 945 as described with reference to FIG. 9.

At 1535, the method may include transmitting, to a base station, a measurement report including the set of measured values including an offset value corresponding to the offset applied to the respective measured value associated with the first cell and offset values corresponding to the offset applied to the one or more neighboring cells associated with the first deployment mode. The operations of 1535 may be performed in accordance with examples as disclosed herein. In some examples, aspects of the operations of 1535 may be performed by a frequency measurement component 935 as described with reference to FIG. 9.

The following provides an overview of aspects of the present disclosure:

Aspect 1: A method for wireless communication at a UE, comprising: determining that a first cell is associated with a first deployment mode of a plurality of deployment modes based at least in part on at least one of a plurality of conditions of the first cell being satisfied, the first deployment mode associated with serving one or more UEs travelling at a speed above a speed threshold; selecting, based at least in part on the determination, at least one of a frequency-based initial cell selection or a cell-based initial cell selection for the UE, wherein the selection is based at least in part on a frequency database or a cell database, or both; measuring one or more frequencies of one or more cells including the first cell to obtain a set of measured parameters, each cell of the one or more cells corresponding to a respective deployment mode of the plurality of deployment modes and a respective measured parameter of the set of measured parameters; selecting a candidate cell from the one or more cells based at least in part on the respective measured parameters of each cell and the respective deployment modes of each cell; and establishing, as part of the initial cell selection, a connection with the candidate cell based at least in part on selecting the candidate cell.

Aspect 2: The method of aspect 1, further comprising: receiving, from the first cell, an indication of the first deployment mode; determining that the at least one condition is satisfied based at least in part on receiving the indication of the first deployment mode; selecting the cell-based initial cell selection based at least in part on the at least one condition being associated with the frequency database and the cell database; and determining a set of power levels associated with the one or more cells based at least in part on the cell-based initial cell selection, the set of measured parameters comprising the set of power levels, wherein the candidate cell is selected based at least in part on the set of power levels.

Aspect 3: The method of aspect 2, wherein selecting the candidate cell comprises: selecting the candidate cell associated with a highest power level of the set of power levels and associated with the first deployment mode.

Aspect 4: The method of any of aspects 2 through 3, further comprising: determining that at least one power level of the set of power levels satisfies a first threshold; determining a subset of the one or more cells based at least in part on the at least one power level of the set of power levels satisfying the first threshold, wherein a respective power level associated with each of the subset of the one or more cells satisfies a second threshold; and selecting the candidate cell from the subset, wherein the candidate cell is associated with the first deployment mode.

Aspect 5: The method of any of aspects 2 through 4, further comprising: determining that at least one power level of the set of power levels satisfies a first threshold; determining a first subset of the one or more cells based at least in part on the at least one power level of the set of power levels satisfying the first threshold, wherein a respective power level associated with each of the first subset of the one or more cells satisfies a second threshold; determining that each cell of the first subset is absent from the cell database; and selecting the candidate cell from a second subset of the one or more cells, the second subset different from the first subset.

Aspect 6: The method of any of aspects 2 through 5, further comprising: determining that each power level of the set of power levels is below a first threshold, wherein the candidate cell is selected based at least in part on determining that each power level of the set of power levels is below the first threshold, the candidate cell associated with a highest power level of the set of power levels.

Aspect 7: The method of any of aspects 2 through 6, further comprising: searching a database of cell frequencies corresponding to the first deployment mode before searching other cell frequencies, wherein searching the database of cell frequencies comprises temporally prioritizing entries of the database of cell frequencies.

Aspect 8: The method of any of aspects 1 through 7, further comprising: selecting the frequency-based initial cell selection based at least in part on the at least one condition being associated with the frequency database; determining a set of power levels associated with a subset of the one or more cells based at least in part on the frequency-based initial cell selection, the set of measured parameters comprising the set of power levels, wherein each cell of the subset corresponds to the first deployment mode; and selecting the candidate cell from the subset based at least in part on the set of power levels.

Aspect 9: The method of any of aspects 1 through 8, further comprising: selecting the frequency-based initial cell selection based at least in part on the at least one condition being associated with the frequency database; determining a set of power levels associated with a first subset of the one or more cells based at least in part on the frequency-based initial cell selection, the set of measured parameters comprising the set of power levels, wherein each cell of the first subset corresponds to the first deployment mode; and selecting the candidate cell from a second subset of the one or more cells based at least in part on the set of power levels, the second subset exclusive of the first subset.

Aspect 10: The method of any of aspects 1 through 9, further comprising: determining the UE is associated with a first radio access technology; and scanning frequencies associated with the first radio access technology, wherein measuring the one or more frequencies associated with the one or more cells is based at least in part on scanning the frequencies associated with the first radio access technology.

Aspect 11: The method of any of aspects 1 through 10, further comprising: determining whether an indication associated with the one or more cells is set to true; and adding the measured one or more frequencies to a database based at least in part on the associated indication being set to true.

Aspect 12: The method of any of aspects 1 through 11, wherein the UE is associated with a first radio access technology and wherein the at least one condition comprises: receiving system information that indicates the first deployment mode from the first cell, wherein the first cell is associated with a second radio access technology.

Aspect 13: The method of aspect 12, wherein the system information comprises a random access channel preamble configuration indicative of the first deployment mode.

Aspect 14: The method of any of aspects 12 through 13, wherein the system information comprises a system information block that includes a deployment mode flag indicative of the first deployment mode.

Aspect 15: The method of any of aspects 1 through 14, wherein the at least one condition comprises: receiving system information that indicates the first deployment mode from the first cell.

Aspect 16: The method of aspect 15, further comprising: adding a measured frequency corresponding to the first cell to a database, wherein the database is valid for a period of time; determining that at least one cell of the one or more cells is a potential candidate cell based at least in part on the measured frequency being present in the database; and adding an identifier of the potential candidate cell to a second database.

Aspect 17: The method of any of aspects 1 through 16, wherein the at least one condition comprises: detecting, by at least one subscriber identity module card of the UE, that the at least one condition is satisfied, wherein the plurality of conditions comprises a random access channel preamble configuration associated with the first deployment mode, a system information block 1 (SIB-1) comprising a first deployment mode flag, a system information block 2 (SIB-2) comprising the first deployment mode flag, or a frequency tracking loop (FTL) jump at the UE, or any combination thereof.

Aspect 18: The method of any of aspects 1 through 17, wherein determining that the first cell is associated with the first deployment mode further comprises: determining a country code associated with the first cell, a public land mobile network associated with the cell, or both.

Aspect 19: The method of any of aspects 1 through 18, wherein determining that the first cell is associated with the first deployment mode further comprises: determining that a velocity associated with the UE exceeds a threshold based at least in part on one or more sensors of the UE.

Aspect 20: The method of any of aspects 1 through 19, wherein determining that the first cell is associated with the first deployment mode further comprises: obtaining information from one or more other UEs indicating that the first cell is associated with the first deployment mode based at least in part on a cell global identifier of the first cell.

Aspect 21: The method of any of aspects 1 through 20, wherein the UE selects from one of the frequency-based initial cell selection or the cell-based initial cell selection based at least in part on connecting to a network based at least in part on the UE powering up, connecting to a network based at least in part on the UE being in a reduced capability mode, connecting to a network based at least in part on the UE being out of service, connecting to a network based at least in part on the UE experiencing a radio link failure, or connecting to a network based at least in part on the UE performing a fast return procedure.

Aspect 22: A method for wireless communication at a UE, comprising: determining that a first cell is associated with a first deployment mode of a plurality of deployment modes based at least in part on one or more conditions being satisfied, the first deployment mode associated with a speed above a speed threshold; establishing a connection with the first cell based at least in part on determining that the first cell is associated with the first deployment mode; performing a set of measurements for one or more neighboring cells and the first cell to obtain a set of measured values, each of the one or more neighboring cells and the first cell corresponding to a respective measured value of the set of measured values; applying an offset to the respective measured value associated with the first cell based at least in part on the first cell being associated with the first deployment mode; and determining whether to connect to one of the one or more neighboring cells based at least in part on the applied offset to the respective measured value associated with the first cell and respective measured values associated with the one or more neighboring cells.

Aspect 23: The method of aspect 22, further comprising: applying the offset to one or more other cells, wherein each of the one or more other cells is associated with the first deployment mode.

Aspect 24: The method of any of aspects 22 through 23, wherein the first cell is associated with a first radio access technology and the one or more neighboring cells is associated with the first radio access technology or a second radio access technology, the method further comprising: applying the offset to a subset of the one or more neighboring cells associated with the first deployment mode; and transmitting, to a base station, a measurement report comprising the set of measured values including an offset value corresponding to the offset applied to the respective measured value associated with the first cell and offset values corresponding to the offset applied to the one or more neighboring cells associated with the first deployment mode.

Aspect 25: The method of any of aspects 22 through 24, further comprising: transmitting, to a base station, a measurement report comprising the set of measured values including an offset value corresponding to the offset applied to the respective measured value associated with the first cell.

Aspect 26: The method of aspect 25, further comprising: receiving, from the base station, a handover command indicating that the UE is to handover to one of the one or more neighboring cells based at least in part on the measurement report; and performing cell handover based at least in part on receiving the handover command.

Aspect 27: The method of any of aspects 25 through 26, wherein the UE is in an RRC connected mode.

Aspect 28: The method of any of aspects 22 through 27, wherein the UE is in an RRC idle mode or an RRC inactive mode.

Aspect 29: The method of any of aspects 22 through 28, wherein the UE is associated with a first radio access technology and wherein the one or more conditions comprises: receiving system information that indicates the first deployment mode from the first cell, wherein the first cell is associated with a second radio access technology.

Aspect 30: An apparatus for wireless communication at a UE, comprising a processor; memory coupled with the processor; and instructions stored in the memory and executable by the processor to cause the apparatus to perform a method of any of aspects 1 through 21.

Aspect 31: An apparatus for wireless communication at a UE, comprising at least one means for performing a method of any of aspects 1 through 21.

Aspect 32: A non-transitory computer-readable medium storing code for wireless communication at a UE, the code comprising instructions executable by a processor to perform a method of any of aspects 1 through 21.

Aspect 33: An apparatus for wireless communication at a UE, comprising a processor; memory coupled with the processor; and instructions stored in the memory and executable by the processor to cause the apparatus to perform a method of any of aspects 22 through 29.

Aspect 34: An apparatus for wireless communication at a UE, comprising at least one means for performing a method of any of aspects 22 through 29.

Aspect 35: A non-transitory computer-readable medium storing code for wireless communication at a UE, the code comprising instructions executable by a processor to perform a method of any of aspects 22 through 29.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a UE, comprising:
    determining that a first cell is associated with a first deployment mode of a plurality of deployment modes based at least in part on at least one of a plurality of conditions of the first cell being satisfied, the first deployment mode associated with serving one or more UEs travelling at a speed above a speed threshold;
    selecting, based at least in part on the determination, at least one of a frequency-based initial cell selection or a cell-based initial cell selection for the UE, wherein the selection is based at least in part on a frequency database or a cell database, or both;
    measuring one or more frequencies of one or more cells including the first cell to obtain a set of measured parameters, each cell of the one or more cells corresponding to a respective deployment mode of the plurality of deployment modes and a respective measured parameter of the set of measured parameters;
    selecting a candidate cell from the one or more cells based at least in part on the respective measured parameters of each cell and the respective deployment modes of each cell; and
    establishing, as part of the initial cell selection, a connection with the candidate cell based at least in part on selecting the candidate cell.

2. The method of claim 1, further comprising:
    receiving, from the first cell, an indication of the first deployment mode;
    determining that the at least one condition is satisfied based at least in part on receiving the indication of the first deployment mode;
    selecting the cell-based initial cell selection based at least in part on the at least one condition being associated with the frequency database and the cell database; and
    determining a set of power levels associated with the one or more cells based at least in part on the cell-based initial cell selection, the set of measured parameters comprising the set of power levels, wherein the candidate cell is selected based at least in part on the set of power levels.

3. The method of claim 2, wherein selecting the candidate cell comprises:
    selecting the candidate cell associated with a highest power level of the set of power levels and associated with the first deployment mode.

4. The method claim 2, further comprising:
    determining that at least one power level of the set of power levels satisfies a first threshold;
    determining a subset of the one or more cells based at least in part on the at least one power level of the set of power levels satisfying the first threshold, wherein a respective power level associated with each of the subset of the one or more cells satisfies a second threshold; and
    selecting the candidate cell from the subset, wherein the candidate cell is associated with the first deployment mode.

5. The method of claim 2, further comprising:
determining that at least one power level of the set of power levels satisfies a first threshold;
determining a first subset of the one or more cells based at least in part on the at least one power level of the set of power levels satisfying the first threshold, wherein a respective power level associated with each of the first subset of the one or more cells satisfies a second threshold;
determining that each cell of the first subset is absent from the cell database; and
selecting the candidate cell from a second subset of the one or more cells, the second subset different from the first subset.

6. The method of claim 2, further comprising:
determining that each power level of the set of power levels is below a first threshold, wherein the candidate cell is selected based at least in part on determining that each power level of the set of power levels is below the first threshold, the candidate cell associated with a highest power level of the set of power levels.

7. The method of claim 2, further comprising:
searching a database of cell frequencies corresponding to the first deployment mode before searching other cell frequencies, wherein searching the database of cell frequencies comprises temporally prioritizing entries of the database of cell frequencies.

8. The method of claim 1, further comprising:
selecting the frequency-based initial cell selection based at least in part on the at least one condition being associated with the frequency database;
determining a set of power levels associated with a subset of the one or more cells based at least in part on the frequency-based initial cell selection, the set of measured parameters comprising the set of power levels, wherein each cell of the subset corresponds to the first deployment mode; and
selecting the candidate cell from the subset based at least in part on the set of power levels.

9. The method of claim 1, further comprising:
selecting frequency-based initial cell selection based at least in part on the at least one condition being associated with the frequency database;
determining a set of power levels associated with a first subset of the one or more cells based at least in part on the frequency-based initial cell selection, the set of measured parameters comprising the set of power levels, wherein each cell of the first subset corresponds to the first deployment mode; and
selecting the candidate cell from a second subset of the one or more cells based at least in part on the set of power levels, the second subset exclusive of the first subset.

10. The method of claim 1, further comprising:
determining the UE is associated with a first radio access technology; and
scanning frequencies associated with the first radio access technology, wherein measuring the one or more frequencies associated with the one or more cells is based at least in part on scanning the frequencies associated with the first radio access technology.

11. The method of claim 1, further comprising:
determining whether an indication associated with the one or more cells is set to true; and
adding the measured one or more frequencies to a database based at least in part on the associated indication being set to true.

12. The method of claim 1, wherein the at least one condition comprises:
receiving system information that indicates the first deployment mode from the first cell, wherein the first cell is associated with a second radio access technology.

13. The method of claim 12, wherein:
the system information comprises a random access channel preamble configuration indicative of the first deployment mode.

14. The method of claim 12, wherein:
the system information comprises a system information block that includes a deployment mode flag indicative of the first deployment mode.

15. The method of claim 1, wherein the at least one condition comprises:
receiving system information that indicates the first deployment mode from the first cell.

16. The method of claim 15, further comprising:
adding a measured frequency corresponding to the first cell to a database, wherein the database is valid for a period of time;
determining that at least one cell of the one or more cells is a potential candidate cell based at least in part on the measured frequency being present in the database; and
adding an identifier of the potential candidate cell to a second database.

17. The method of claim 1, wherein the at least one condition comprises:
detecting, by at least one subscriber identity module card of the UE, that the at least one condition is satisfied, wherein the plurality of conditions comprises a random access channel preamble configuration associated with the first deployment mode, a system information block 1 (SIB-1) comprising a first deployment mode flag, a system information block 2 (SIB-2) comprising the first deployment mode flag, or a frequency tracking loop (FTL) jump at the UE, or any combination thereof.

18. The method of claim 1, wherein:
the UE selects from one of the frequency-based initial cell selection or the cell-based initial cell selection based at least in part on connecting to a network based at least in part on the UE powering up, connecting to a network based at least in part on the UE being in a reduced capability mode, connecting to a network based at least in part on the UE being out of service, connecting to a network based at least in part on the UE experiencing a radio link failure, or connecting to a network based at least in part on the UE performing a fast return procedure.

19. A method for wireless communication at a UE, comprising:
determining that a first cell is associated with a first deployment mode of a plurality of deployment modes based at least in part on one or more conditions being satisfied, the first deployment mode associated with a speed above a speed threshold;
establishing a connection with the first cell based at least in part on determining that the first cell is associated with the first deployment mode;
performing a set of measurements for one or more neighboring cells and the first cell to obtain a set of measured values, each of the one or more neighboring cells and the first cell corresponding to a respective measured value of the set of measured values;

applying an offset to the respective measured value associated with the first cell based at least in part on the first cell being associated with the first deployment mode; and determining whether to connect to one of the one or more neighboring cells based at least in part on the applied offset to the respective measured value associated with the first cell and respective measured values associated with the one or more neighboring cells.

20. The method of claim 19, further comprising:
applying the offset to one or more other cells, wherein each of the one or more other cells is associated with the first deployment mode.

21. The method of any of claim 19, wherein the first cell is associated with a first radio access technology and the one or more neighboring cells is associated with the first radio access technology or a second radio access technology, the method further comprising:
applying the offset to a subset of the one or more neighboring cells associated with the first deployment mode; and
transmitting, to a base station, a measurement report comprising the set of measured values including an offset value corresponding to the offset applied to the respective measured value associated with the first cell and offset values corresponding to the offset applied to the one or more neighboring cells associated with the first deployment mode.

22. The method of any of claim 19, further comprising:
transmitting, to a base station, a measurement report comprising the set of measured values including an offset value corresponding to the offset applied to the respective measured value associated with the first cell.

23. The method of claim 22, further comprising:
receiving, from the base station, a handover command indicating that the UE is to handover to one of the one or more neighboring cells based at least in part on the measurement report; and
performing cell handover based at least in part on receiving the handover command.

24. The method of any of claim 22, wherein:
the UE is in a radio resource control (RRC) connected mode.

25. The method of any of claim 19, wherein:
the UE is in a radio resource control (RRC) idle mode or an RRC inactive mode.

26. The method of any of claim 19, wherein the one or more conditions comprises:
receiving system information that indicates the first deployment mode from the first cell, wherein the first cell is associated with a second radio access technology.

27. An apparatus for wireless communication at a UE, comprising:
a processor;
memory coupled with the processor; and
instructions stored in the memory and executable by the processor to cause the apparatus to:
determine that a first cell is associated with a first deployment mode of a plurality of deployment modes based at least in part on at least one of a plurality of conditions of the first cell being satisfied, the first deployment mode associated with serving one or more UEs travelling at a speed above a speed threshold;
select, based at least in part on the determination, at least one of a frequency-based initial cell selection or a cell-based initial cell selection for the UE, wherein the selection is based at least in part on a frequency database or a cell database, or both;
measure one or more frequencies of one or more cells including the first cell to obtain a set of measured parameters, each cell of the one or more cells corresponding to a respective deployment mode of the plurality of deployment modes and a respective measured parameter of the set of measured parameters;
select a candidate cell from the one or more cells based at least in part on the respective measured parameters of each cell and the respective deployment modes of each cell; and
establish, as part of the initial cell selection, a connection with the candidate cell based at least in part on selecting the candidate cell.

28. The apparatus of claim 27, wherein the instructions are further executable by the processor to cause the apparatus to:
receive, from the first cell, an indication of the first deployment mode;
determine that the at least one condition is satisfied based at least in part on receiving the indication of the first deployment mode;
select the initial cell selection to be the cell-based initial cell selection based at least in part on the at least one condition being associated with the frequency database and the cell database; and
determine a set of power levels associated with the one or more cells based at least in part on the cell-based initial cell selection, the set of measured parameters comprising the set of power levels, wherein the candidate cell is selected based at least in part on the set of power levels.

29. An apparatus for wireless communication at a UE, comprising:
a processor;
memory coupled with the processor; and
instructions stored in the memory and executable by the processor to cause the apparatus to:
determine that a first cell is associated with a first deployment mode of a plurality of deployment modes based at least in part on one or more conditions being satisfied, the first deployment mode associated with a speed above a speed threshold;
establish a connection with the first cell based at least in part on determining that the first cell is associated with the first deployment mode;
perform a set of measurements for one or more neighboring cells and the first cell to obtain a set of measured values, each of the one or more neighboring cells and the first cell corresponding to a respective measured value of the set of measured values;
apply an offset to the respective measured value associated with the first cell based at least in part on the first cell being associated with the first deployment mode; and
determine whether to connect to one of the one or more neighboring cells based at least in part on the applied offset to the respective measured value associated with the first cell and respective measured values associated with the one or more neighboring cells.

30. The apparatus of claim 29, wherein the instructions are further executable by the processor to cause the apparatus to:

apply the offset to one or more other cells, wherein each of the one or more other cells is associated with the first deployment mode.

\* \* \* \* \*